United States Patent [19]
Chiba et al.

[11] Patent Number: 5,537,230
[45] Date of Patent: * Jul. 16, 1996

[54] SIGNAL PROCESSING DEVICE FOR VIDEO PRINTER

[75] Inventors: Kazuhiro Chiba; Noriko Bamba, both of Kyoto, Japan

[73] Assignee: Mitsubishi Denki Kabushiki Kaisha, Tokyo, Japan

[*] Notice: The term of this patent shall not extend beyond the expiration date of Pat. No. 5,227,873.

[21] Appl. No.: 986,562

[22] Filed: Mar. 8, 1993

Related U.S. Application Data

[63] Continuation of Ser. No. 612,969, Nov. 15, 1990, Pat. No. 5,227,873.

[30] Foreign Application Priority Data

Feb. 24, 1988 [JP] Japan ................................. 63-041511
Feb. 24, 1988 [JP] Japan ................................. 63-041512

[51] Int. Cl.⁶ .................................................. H04N 1/46
[52] U.S. Cl. ......................... 358/521; 358/501; 358/525
[58] Field of Search ................................. 358/501, 502, 358/518, 521, 525, 500, 503; 348/252; 346/625, 76 PH; 347/43; H04N 1/46

[56] References Cited

U.S. PATENT DOCUMENTS

| | | | |
|---|---|---|---|
| 3,893,166 | 7/1975 | Pugsley | 358/525 |
| 4,270,141 | 5/1981 | Sakamoto | 358/525 |
| 4,346,402 | 8/1982 | Pugsley | 358/525 |
| 4,712,141 | 12/1987 | Tomohisa et al. | 358/525 |
| 4,776,031 | 10/1988 | Mita | 348/251 |
| 4,855,753 | 8/1989 | Ichikawa et al. | 347/43 |
| 4,887,150 | 12/1989 | Chiba et al. | |
| 4,930,018 | 5/1990 | Chan et al. | 347/43 |

FOREIGN PATENT DOCUMENTS

| | | |
|---|---|---|
| 6410782 | 1/1989 | Japan. |
| 1109967 | 4/1989 | Japan. |
| 1108868 | 4/1989 | Japan. |

*Primary Examiner*—Kim Yen Vu

[57] ABSTRACT

A signal processing device for a video printer which is capable of eliminating white stripes attributed to the block division type drive of a thermal head. The signal processing device also performs aperture correction for correction of high frequency components and carries out color conversion with high precision. The video printer can produce a print having high density. Further, the changing of printing time and print size is available in the video printer.

16 Claims, 24 Drawing Sheets

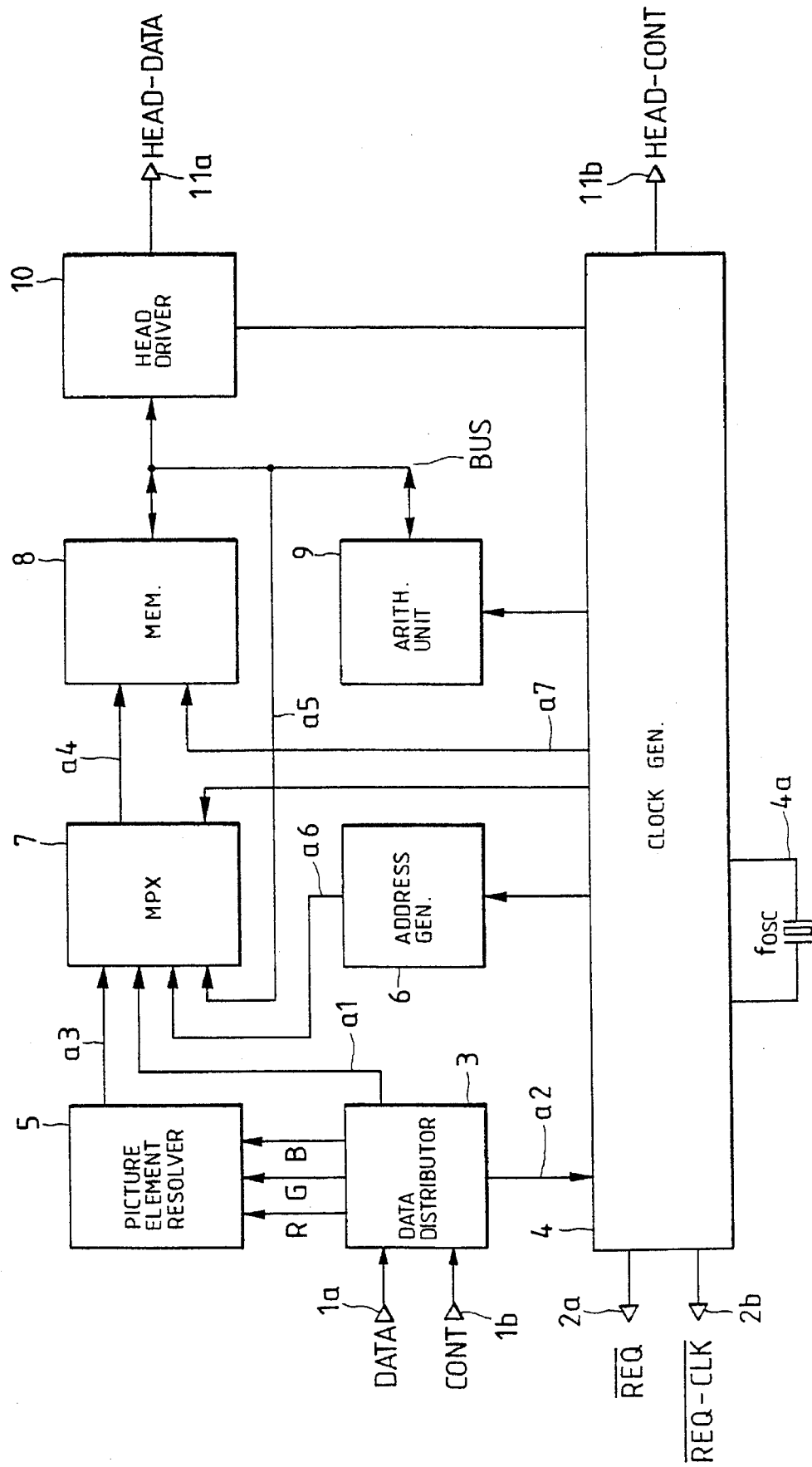

FIG. 2(a)

| COLOR CONVERSION TABLE | GRADATION TABLE |
|---|---|
| "1" | "0" |

14 bits

TABLE CODE (1 bit)

FIG. 2(b)

| | LB III | LB II | LB I | | HB II | HB I |
|---|---|---|---|---|---|---|
| "1" | "0" | "1" | "0" | "1" | "0" | "1" | "0" |
| "1" | "0" | "1" | "0" |
| "1" | "0" |

10 bits

BANK CODE (3 bits)

FIG. 8

| A14 | A13 | A12 | A11 | A10 | K & CLR | |
|-----|-----|-----|-----|-----|---------|---|
| "1" | "1" | "1" | | C | K | |
| "1" | "1" | "1" | | M | K | |
| "1" | "1" | "1" | | Y | K | |
| "1" | "1" | "0" (K=R) | | k | k' | |
| "1" | "1" | "0" (K=R) | | C | (B-K) | (G-K) |
| "1" | "1" | "0" (K=R) | | M | (B-K) | (G-K) |
| "1" | "1" | "0" (K=R) | | Y | (B-K) | (G-K) |
| "1" | "0" | "1" (K=G) | | k | | k' |
| "1" | "0" | "1" (K=G) | | C | (B-K) | (G-K) |
| "1" | "0" | "1" (K=G) | | M | (B-K) | (R-K) |
| "1" | "0" | "1" (K=G) | | Y | (B-K) | (R-K) |
| "1" | "0" | "0" (K=B) | | k | | k' |
| "1" | "0" | "0" (K=B) | | C | (B-K) | (R-K) |
| "1" | "0" | "0" (K=B) | | M | (G-K) | (R-K) |
| "1" | "0" | "0" (K=B) | | Y | (G-K) | (R-K) |

ADDRESS NO. — A14: TABLE CODE; A13, A12: α; A11, A10: INK SPECIFYING; A9–A0: K & CLR

FIG. 12

| BLOCK<br>PHASE | B1 | B2 | B3 | B4 | B5 | B6 | B7 | B8 | B9 | B10 |
|---|---|---|---|---|---|---|---|---|---|---|
| PHS 0 | $e_1$ | $e_2$ | L | L | L | L | L | L | L | L |
| PHS 1 | L | L | $e_1$ | $e_2$ | L | L | L | L | L | L |
| PHS 2 | L | L | L | L | $e_1$ | $e_2$ | L | L | L | L |
| PHS 3 | L | L | L | L | L | L | $e_1$ | $e_2$ | L | L |
| PHS 4 | L | L | L | L | L | L | L | L | $e_1$ | $e_2$ |
|  | HD1 | HD2 | HD3 | HD4 | HD5 | HD6 | HD7 | HD8 | HD9 | HD10 |

"L" MEANS 64 BITS ART SET TO "0".

| CONT | | | | DATA | | | | | |
|---|---|---|---|---|---|---|---|---|---|
| STB | CNT₃ | CNT₂ | CNT₁ | DT₆ | DT₅ | DT₄ | DT₃ | DT₂ | DT₁ |
| — | 1 | 1 | 1 | | | | | | |
| — | 1 | 1 | 0 | | | | | | |
| ↑ | 1 | 0 | 1 | | | | | RST | Y/M/C DATA |
| ↑ | 1 | 0 | 0 | T_C DATA | | | | | |
| ↑ | 0 | 1 | 1 | B DATA | | | | | |
| ↑ | 0 | 1 | 0 | G DATA | | | | | |
| ↑ | 0 | 0 | 1 | R DATA | | | | | |
| — | 0 | 0 | 0 | | | | | | |

INDICATE UNUSED PORTIONS.

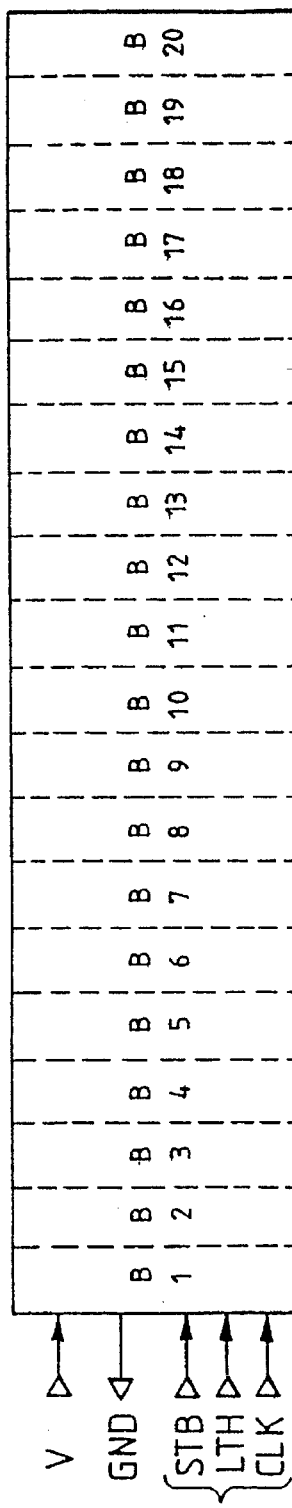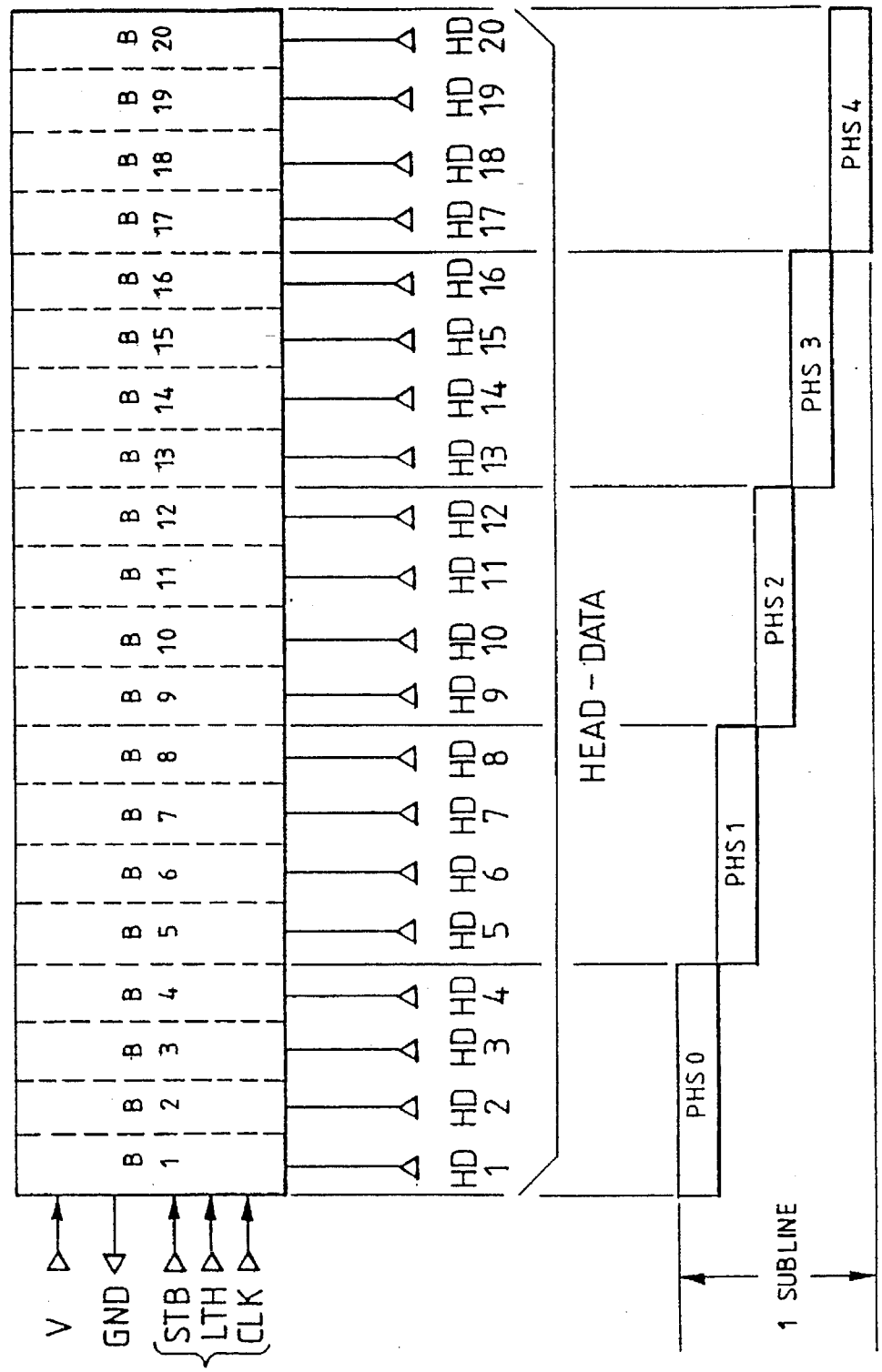
FIG. 17(a)
FIG. 17(b)

FIG.20(a), FIG.20(b), FIG.20(c), FIG.20(d), FIG.20(e)

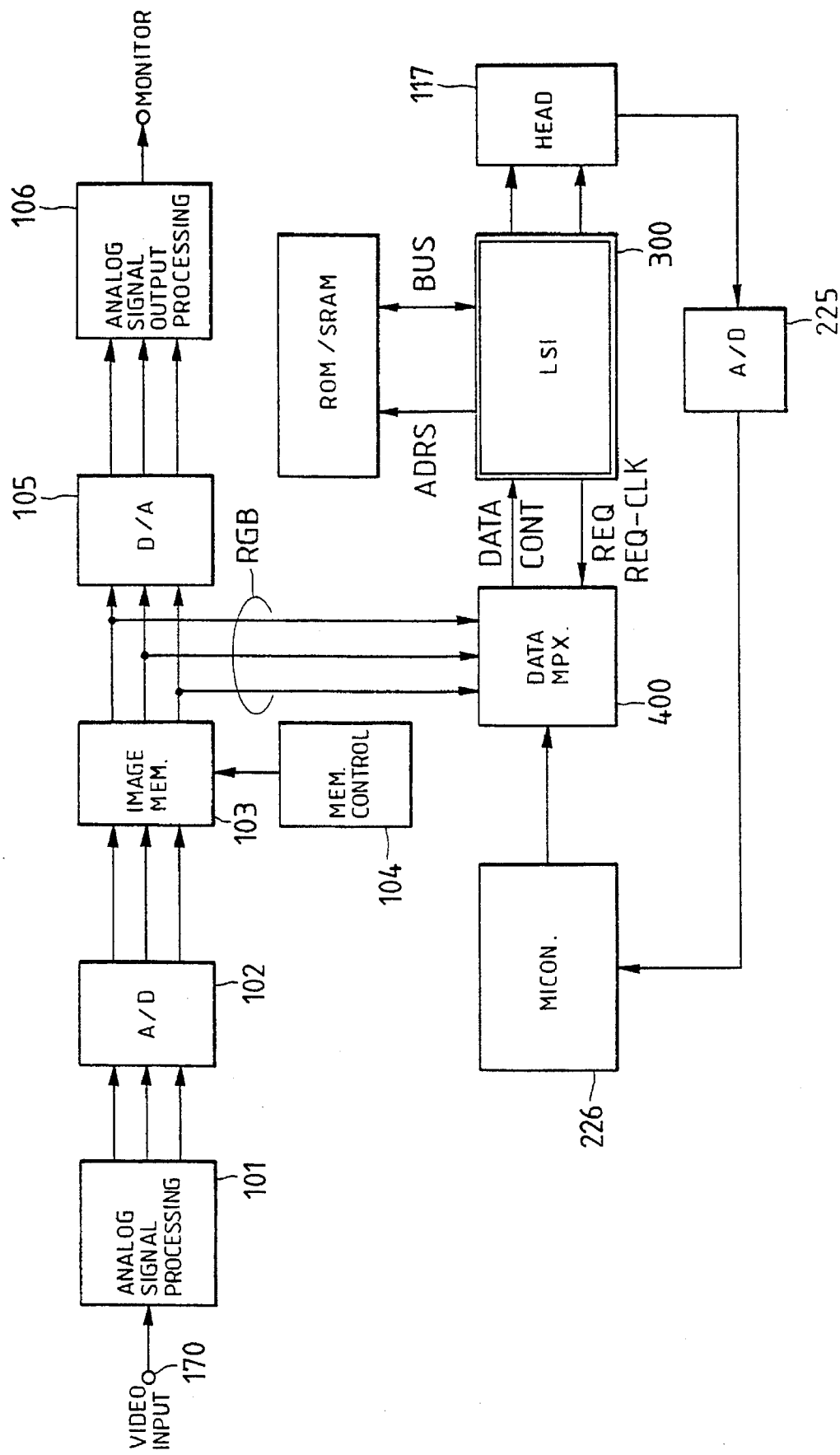

PRIOR ART  PRIOR ART  PRIOR ART  PRIOR ART

| FIG.26(a) | FIG.26(b) | FIG.26(c) | FIG.26(d) |
|---|---|---|---|
| $D_1$ | 0 | $D_1$ | 0 |
| $D_2$ | 0 | $D_2$ | 0 |
| ⋮ | ⋮ | ⋮ | ⋮ |
| $D_{256}$ | 0 | $D_{255}$ | 0 |
| $\alpha \cdot D_{256}$ | $\alpha \cdot D_{256}$ | $D_{256}$ | 0 |
| $\alpha \cdot D_{257}$ | $\alpha \cdot D_{257}$ | 0 | $D_{257}$ |
| 0 | $D_{258}$ | 0 | $D_{258}$ |
| ⋮ | ⋮ | ⋮ | ⋮ |
| 0 | $D_{511}$ | 0 | $D_{511}$ |
| 0 | $D_{512}$ | 0 | $D_{512}$ |

SIGNAL PROCESSING DEVICE FOR VIDEO PRINTER

This application is a continuation of U.S. patent application Ser. No. 07/612,969, filed on Nov. 15, 1990, now U.S. Pat. No. 5,227,875. The entire contents of which are hereby incorporated by reference.

BACKGROUND OF THE INVENTION

This invention relates to a signal processing device in a video printer in which a thermal head is used for the hard-copying of TV (television) broadcast images or the like.

Recently, a video printer for readily hard-copying video images has been developed, and a number of patent applications have been filed with the Patent Office. FIG. 24 shows one example of a conventional video printer signal processing device which has been disclosed by Japanese Patent Application (OPI) No. 84671/1987 (the term "OPI" as used herein means an "unexamined published application"). In the signal processing device, printing is carried out with a line divided into a plurality of blocks for the purpose of economical use of electric power.

In FIG. 24, reference numeral 101 designates analog signal processing means; 102, an analog-to-digital (A/D) converter; 103, an image memory; 104, memory control means; 105, a digital-to-analog (D/A) converter; 106, analog signal output processing means; 107, color selecting means; 108, a line memory; 150, joint processing means comprising a data read-only memory 109 (hereinafter referred to as "a ROM 109", when applicable) and a correction data memory 110; and 111, printing control means.

Further in FIG. 24, reference numeral 160 designates a half-tone control means comprising a correction data inserting circuit 112, a white data inserting circuit 113, a white data generating circuit 14, a data processing circuit 115, and gradation pulse generating means 116; 117, a heat-sensitive line head; 118, a temperature sensor; and 119, temperature signal conversion means.

The operation of the video printer signal processing device thus organized will be described.

An image signal applied to the video input terminal 170 is supplied to the analog signal processing means 101, where it is converted into R (red), G (green) and B (blue) color signals. The color signals are applied to the analog-to-digital converter circuit 102, where they are converted into R, G and B digital color signals. The R, G and B digital color signals are simultaneously stored by the image memory 103. The three-color digital image data stored in the image memory 103 are red out at the same speed by the memory control means 104 as they are recorded. Furthermore, these digital image data are converted by the digital-to-analog converter 105 into the three-color (R, G and B) analog signals which are the same as those of the memory input images. The analog signals are supplied to the analog signal output processing means 106, where they are converted into a video signal.

On the other hand, one of the R, G and B digital signals; that is, one color is selected by the color selecting means 107 and stored in the line memory 108. The term "one line of data" as used herein is intended to mean "a vertical line of data" as shown in FIG. 25. One line of data are not printed at a time; that is, they are divided into a plurality of blocks (two blocks in this case) for printing. Of these data, the data at the joints of blocks is supplied to the data ROM 109, where it is subjected to correction. The data thus processed is applied to the corrected data memory 110. In the conversion of data, the output temperature signal of the temperature sensor 118 is applied through the temperature signal conversion means 119, as a digital signal, to the data ROM 109, so that conversion data corresponding to the head temperature at that time instant is outputted with the digital signal as address.

One line of image data stored in the line memory 108 is supplied to the half-tone control means 160. In the half-tone control means 160, the data at the joint of blocks is replaced by joint correction data by the correction data inserting circuit 112, and is converted by the white data inserting circuit 113 into data trains suitable for division printing as shown in the parts (c) and (b) of FIG. 26, which are supplied through the data processing circuit 115 to the heat-sensitive line head 117, so that they are printed. The time interval that the heat-sensitive line head is electrically energized is determined by the output strobe pulse of the gradation pulse generating means 116.

As was described above, when the printer accomplishes the transfer of data for each block, the next line (which is the line on the right of the heat-sensitive line head in FIG. 25) of data is loaded in the line memory 108, the printing operation is started again.

In the video printer, its heat-sensitive head is arranged vertically of the TV picture as shown in FIG. 25. The printing is carried out line by line from the left most line to the rightmost line as indicated by the arrow in FIG. 25. That is, the printing of one color is ended at the rightmost line. The printer employs the system of printing colors successively which is generally employed by heat-sensitive. That is, when a printing mechanism (not shown) accomplishes a printing operation in one color, the printed sheet is set at the original printing start position, and a printing operation in the next color is carried out. When the printing operations in three colors are carried out in this manner, the printing operation of one sheet is ended.

A one line division printing operation will be described with reference to FIG. 26. In this connection, it is assumed that the heat-sensitive head has 512 heat-generating resistors, the 1st through 256-th heat generating resistors for a block A, and the 257-th through 512-th heat generating resistors for a block B.

In the division printing operation, in the first process the block B is printed, while the block A is not printed (as shown in the part (b) of FIG. 26); and in the next process, the block A is printed, but the block B is not printed (as shown in the part (a) of FIG. 26). Thus, the printing of one line is accomplished by performing the block printing operation twice. In FIG. 26, Dn represents the data of the n-th heating generating element, and α represents the correction rate of the joint of blocks.

The reason why correction is required for the joint of blocks is as follows: In the thermal type printer in which the printing operation is carried out with one line divided into two blocks, the heat generating resistor at the middle of the thermal head is cooled by the block which is not heated, as a result of which the printing density is lowered. Accordingly, if no correction is given to the joint of blocks, then the boundary between the blocks is lowered in printing density when printed, thus showing a white stripe. In order to eliminate this difficulty, the correction of printing density is carried out for the joint of blocks (hereinafter referred to as "joint density correction", when applicable).

Thus, in the division printing method, as for each line, the joint of blocks is printed twice, and the remaining parts are printed only once.

Now, the necessity of changing the correction data for the joint of blocks according to temperature will be described. FIG. 27 is a graphical representation indicating gradation with electrical energization time of the head.

In FIG. 27, the curve A indicates normal data with a temperature a; the curve B, normal data with a temperature b; the curve C, correction data with the temperature a; and the curve D, correction data with the temperature b, where a<b.

In order to print with a gradation m, the electrical energization time of the head should be $t_A$ with the temperature a, and $t_B$ with the temperature b; and for the joint portion, the electrical energization time should be $t_C \times 2$ with the temperature a, and $t_D \times 2$ with the temperature b, where $t_A/t_B = t_C/t_D$. Thus, the correction data must be changed with temperature.

In this case, the correction data can be changed with temperature and with gradation.

This joint density correction is achieved when the joint processing means 150 corrects the input data. That is, the joint portion's data to be supplied to the head is subjected to data correction by the data ROM 109.

A plurality of trains of correction data according to head temperatures have been written in the data ROM 109 in advance.

The head 117 has the temperature sensor 118, as was described above. A head temperature detected by the temperature sensor 118 is converted into a digital temperature signal by the temperature signal conversion means 119. With the aid of the digital temperature signal, the data ROM 109 switches the above-described correction data groups, and supplies th correction data assigned to the temperature to the correction data memory 110, where it is stored.

Thereafter, according to the above-described printing operation, data is transferred from the line memory 108 to the half-tone control means 160. In this operation, the timing of data to be corrected being detected, the armature of the correction data inserting circuit 122 is operated to supply the output correction data of the correction data memory 110 to the data processing circuit 115. In this connection, the white data inserting circuit 113 has been so operated that the data transferred to the not-printed block of the head is replaced by white data.

One example of the arrangement of the joint processing means 150 and the half-tone control means 160 will be described with reference to FIG. 28, in which parts corresponding functionally to those which have been described with reference to FIG. 24 are therefore designated by the same reference numerals or characters.

In FIG. 28, reference numeral 218 designates a data comparator; 219, a data discriminator; 220, a decoder; 221, a gamma read-only memory (hereinafter referred to merely as "a ROM" when applicable); 222, a temperature characteristic correction data selector; 118, a temperature sensor; 224, a temperature signal amplifier; 225, an analog-to-digital (A/D) converter; 226, a microcomputer; and 227, gradation control means 227.

The operation of the circuit shown in FIG. 28 will be described. In this connection, it is assumed that one line of data is stored in the line memory 108. First, the print control means 111 reads from the line memory 108 data groups with head addresses to be corrected, and supplies them to the data ROM 109. The data ROM 109 outputs correction data corresponding to the input data. In the correction data memory 110, the wire/read address is determined by the decoder 220. Thereafter, the printer is placed in printing state, and the data from the line memory 108 are successively supplied through the correction data inserting circuit 112 to the following stage.

When, in this case, the transfer timing of data to be corrected occurs, the armature of the correction data inserting circuit 112 is tripped by the printing control section 111 to select one of the inputs, that is, to select the correction data supplied by the correction data memory 110. These continuous data trains are supplied through the white data inserting circuit 113 to the data comparator 218. In the data comparator 218, the input data is compared with gradation data provided by the gradation control means 227, so that electrical energization data for controlling the electrical energization of (turning on and off) the heat-generating element on the heat-sensitive head 117 is outputted. The electrical energization data is applied to one of the blocks of the head by means of the data discriminator 219.

After the transfer of data to the heat-sensitive head 17, the gradation pulse generating means 116 outputs a strobe pulse to permit the electrical energization of the heat-generating elements. Thereafter, the line memory 108 outputs data, which is applied through the correction data inserting circuit 112, the white data inserting circuit 113, and the data processing circuit 115 to the heat-sensitive head 117, to permit the electrical energization of the heat-generating elements. In this case, as shown in the parts (a) and (b) of FIG. 26, by means of the data discriminator 219, the white data to the head is distributed to the block which is opposite to that in the previous data arrangement. Thus, in the case of the two-block head, the above-described transfer of data is carried out twice, the printing of one line is achieved.

Now, a temperature control system for the joint processing means will be described.

At the beginning of the transfer of a line, the line memory 108 applies the data on the joint portion thereof to the data ROMs 109 which are different in data content separated according to temperatures. On the other hand, the temperature sensor 118 is provided near the joint of blocks of the heat-sensitive head 117, outputting a temperature signal at all times. The temperature signal is amplified by the temperature signal amplifier 224 to the level which is required for analog-to-digital conversion. The temperature signal thus amplified is applied to the analog-to-digital (A/D) converter 225, where it is converted into a digital temperature signal of several bits. The digital temperature signal is supplied to the microcomputer 226. The microcomputer 226, receiving a control signal provided by the print control means 111 for every line, changes the digital temperature signal for every line which is always delivered from the analog-to-digital converter and is variable.

The reason why the temperature signal is changed for every line as described above is as follows: Although the head temperature increases during the printing operation, the temperature signal cannot be changed during the transfer of data. Therefore, it goes without saying that it may be changed for every gradation.

The joint data supplied to the data ROMs 109 are corrected into joint correction data, respectively, which are applied to the temperature characteristic correction data selector 222. Of the joint correction data with different temperatures which are transferred to the temperature characteristic correction data selector 222, one which is suitable for the temperature at that time instant is selected by the digital temperature signal which changes every line, and is stored in the correction data memory 110.

Next, the printing data are supplied to correction data inserting circuit 112 by the line memory 108. In this operation, the data on the joint portion, after being replaced by the correction data stored in the correction data memory 110, is applied to the comparator 218 in the data processing circuit 115, where it is compared with the gradation data provided by the gradation control means 227. The data processing circuit 115 divides the data into data (1) and data (2) which are transferred to the blocks A and B of the head, respectively. In this operation, the white data provided by the white data generating circuit 114 is inserted alternately into the data (1) and the data (2). The white data is inserted into the data (1) and the data (2) for every line, and the printing of one line is accomplished by printing the block B and the block A. On the other hand, the gradation pulse generating means 116, which is controlled by the gradation data outputted by the gradation control means 227, applies a gradation data parameter to the head.

The conventional video printer is designed as described above. Therefore, the video printer is disadvantageous in that the white stripe attributed to the block division type drive of the thermal head, which is intended to use electric power more economically, can be corrected, but cannot be eliminated. In addition, the conventional video printer suffers from technical problems in that it has no aperture correction means which should be provided for a video printer, or it has no high precision color conversion means which is essential for fine copy images.

SUMMARY OF THE INVENTION

Accordingly, an object of this invention is to solve the above-described problems of the a conventional video printer. More specifically, an object of the invention is to provide a signal processing device for a video printer which can eliminate the white stripe attributed to the block division type drive of the thermal head, perform aperture correction for correction of high frequency components, carry out color conversion with high precision, and which can achieve a printing operation with high density, or select recording conditions concerning such factors as the changing of printing time and the changing of print size, from "A6" to "A4" and vice versa, for example.

The above, and other objects of the present invention are accomplished by the provision of a signal processing device for a video printer comprising (1) means for converting R, G and B video signals into Y, M and C printing signals; (2) arithmetic means for aperture correction; (3) heat generation control means for a thermal head; (4) memory means having a ROM and a SRAM; and operation mode selecting means.

BRIEF DESCRIPTION OF THE DRAWINGS

FIG. 1 is a block diagram showing a signal processing device for a video printer according to an embodiment of this invention;

FIG. 2 is an explanatory diagram showing a digital memory map used in the signal processing device according to the above embodiment of the invention;

FIG. 8 is a map diagram showing one example of the color conversion table shown in FIG. 2;

FIG. 12 is an explanatory diagram showing one example of head data distribution;

FIG. 17 is an explanatory diagram showing one example of a thermal head for A4 size, and a drive method thereof;

FIG. 20 is a timing chart illustrative of the operation of the circuit shown in FIG. 19;

FIG. 23 is a block diagram showing a video printer employed in the signal processing device of this invention;

FIG. 26 is an explanatory diagram showing output data of the conventional signal processing circuit;

DESCRIPTION OF PREFERRED EMBODIMENTS

Figure 3:
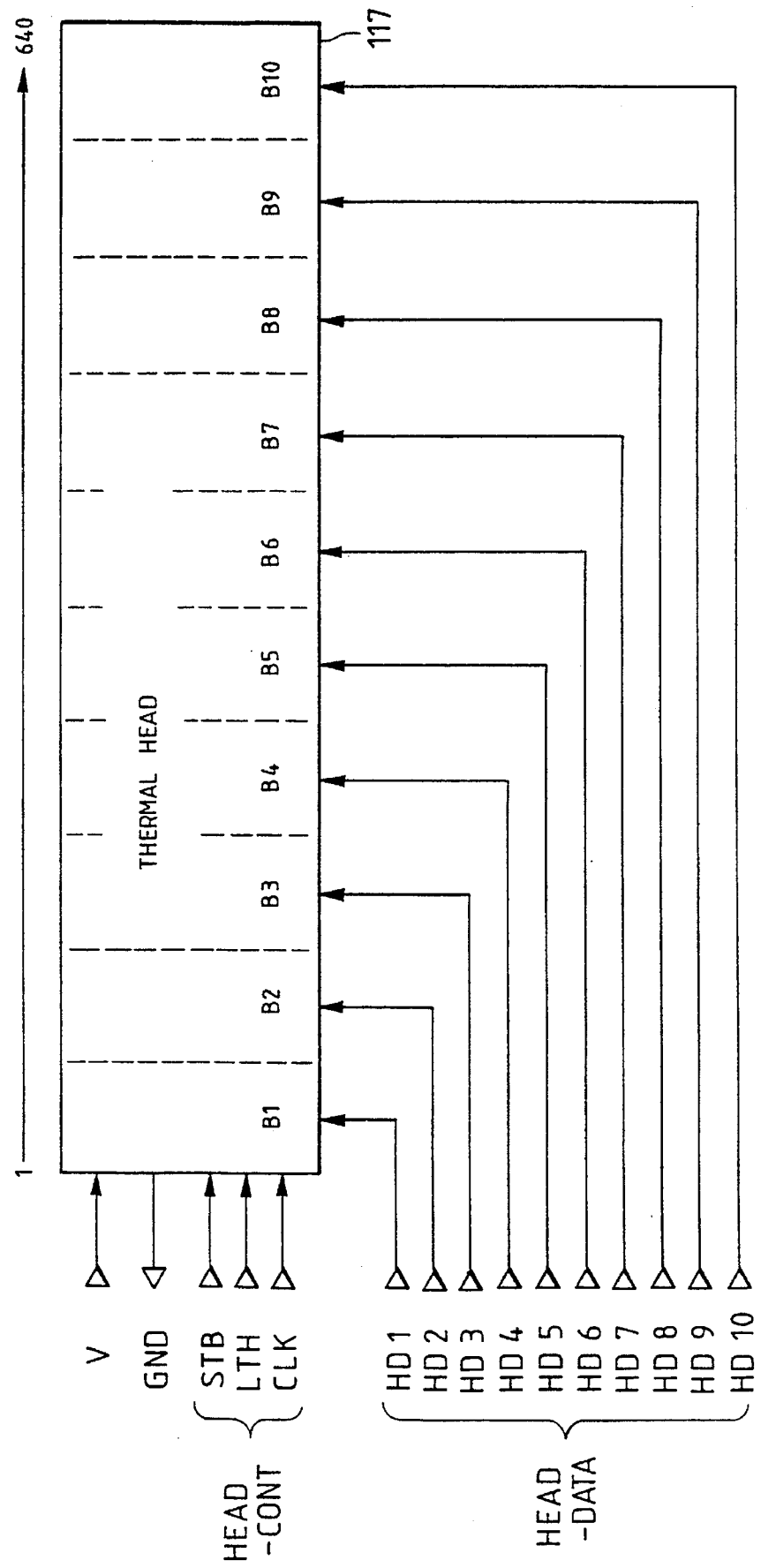
FIG. 3 is an explanatory diagram showing the arrangement of one example of a thermal head used in the printer.

One embodiment of this invention will be described with reference to the accompanying drawings.

FIG. 1 is a block diagram outlining the arrangement of a signal processing device for a video printer which is an embodiment of the invention. In FIG. 1, reference character 1a designates an input terminal for 6-bit multiplex data of an image signal and a command signal (hereinafter referred to as "a DATA", when applicable); 1b, an input terminal for an A-bit (A being more than one) control signal for instructing the identification and the latch timing of the DATA (hereinafter referred to as "a CONT", when applicable); 2a, an output terminal for a REQ signal for requiring the transfer of a predetermined number (B) of picture elements of one line; 2b, an output terminal for a REQ-CLK signal instructing the timing of transfer; 3, a data distributor (signal receiving means, and synchronization transfer request means) for distributing the DATA to various means; 4, a clock generator (clock generating means) with an oscillator 4a; 5, a picture element resolver for R, G and B image signals; 6, an address generator for generating address signals for memory (described later); 7, a multiplex (MPX) circuit for multiplexing a plurality of signals; 8, a memory comprising a ROM (first memory means) and a SRAM (second memory means); 9, an arithmetic unit (arithmetic means) for carrying out an aperture correction arithmetic operation, etc.; 10, a head driver (heat generation control means) for forming drive data for the thermal head; 11a, an output terminal for a thermal head drive data (hereinafter referred to as "HEAD-DATA", when applicable); and 11b, an output terminal for a control signal for transferring the HEAD-data to the thermal head (hereinafter referred to as "a HEAD-CONT", when applicable).

Operation mode selecting means (not shown) comprises means which are additionally incorporated in the clock generator 4, the head driver 10, the arithmetic unit 9, and the memory 8.

In the parts (a) and (b) of FIG. 2, examples of an address map in the memory 8 of the embodiment shown in FIG. 1 is shown with respect to the ROM and the SRAM. The ROM, as shown in the part (a) of FIG. 2, consists of a color conversion table section for converting R, G and B image data into Y, M and C ink density data, and a gradation table section for printing with multiple gradation density independently of temperature. Addresses are formed with 15 bits; that is, a table code of 1 bit and a variable code of 14 bits. On the other hand, the SRAM, as shown in the part (b) of FIG. 2, is made up of three line buffers for temporarily storing density data (hereinafter referred to as "LB I, LB II, and LB III", when applicable), and two head buffers for temporarily storing density data after an aperture correction arithmetic operation for forming the HEAD-DATA (hereinafter referred to as "HB I, and HB II", when applicable). In the part (b) of FIG. 2, the blank regions are regions not used. Each address consists of 1 byte (8 bits) data.

FIG. 3 shows one example of a data interface for a thermal head 117 with 640 heat-generating resistors which is connected at the rear stage of the circuit shown in FIG. 1. As shown in FIG. 3, the HEAD-DATA comprises ten signals HD1 through HD10 which are connected to ten blocks B1 through B10, respectively, each block having 64 heat-generating resistors. The HEAD-CONT comprises a transfer clock signal CLK, a latch signal LTH, and a heat generation permitting signal STB, which are connected to all the blocks. The thermal head 117 has been disclosed for instance by Japanese Patent Application Publication No. 21469-1987 in detail under the same name, and therefore its detailed description is omitted here.

Now, the operation of the embodiment thus organized will be described. For simplification in description, first the parts of the embodiment will be described, and then the whole.
(1. Color image recording operation)

Figure 4:
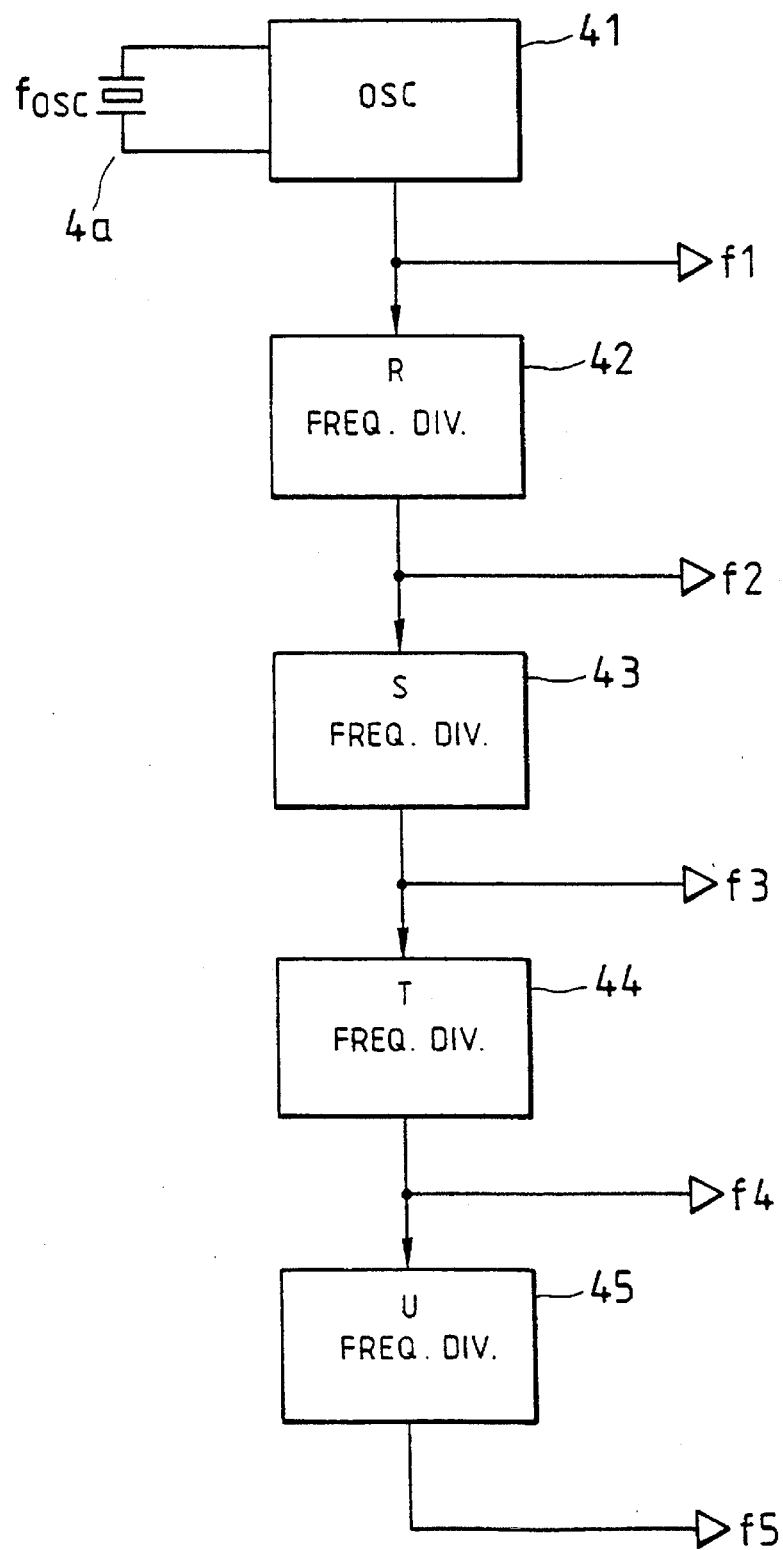
FIG. 4 is a block diagram showing a clock generator in the signal processing device of the invention.

The printing and recording of a desired image is carried out line by line. The operation for each line is mainly determined by the circuitry of the clock generator 4. One example of the arrangement of the clock generator 4 is as shown in FIG. 4. In FIG. 4, reference character 4a designates an oscillating element for determining an original oscillation frequency $f_{osc}$; 41, an oscillator; 42, an R frequency divider; 43, an S frequency divider; 44, a T frequency divider; and 45, a U frequency divider. Those circuit elements 41 through 45 output signals f1 through f5, respectively, as shown in FIG. 4.

The operation of the clock generator 4 thus organized will be described.

The oscillator 41 oscillates at a frequency which is equal to the oscillation frequency $f_{osc}$ of the oscillating element 4a, and outputs a pulse signal f1 of duty 50% through ½ frequency division. The R frequency divider 42 outputs a signal f2 which is obtained by frequency-dividing the pulse signal f1, for instance, with R=172, and its one period is called one slot (hereinafter referred to as "SLT", when applicable), and its time is represented by $t_s$. The S frequency divider 43 outputs a signal f3 which is obtained by frequency-dividing the SLT signal, for instance, with S=64, and its one period is called one phase (hereinafter referred to as "PHS", when applicable). The T frequency divider outputs a signal f4 which is obtained by frequency-dividing the PHS signal, for instance, with T=5, and its one period is called one sub-line (hereinafter referred to as "SBL", when applicable). The U frequency divider 45 outputs a signal f5 which is obtained by frequency-dividing the SBL signal, for instance, with U=4, and its one period is called one line (hereinafter referred to as "LIN", when applicable). One LIN corresponds to one horizontal scanning line of an image; and therefore, in the case of the NTSC system, about 480 LINs form one picture.

The printing and recording of a color image is accomplished by thermally transferring three kinds of ink, yellow (Y) ink, magenta (M) ink, and cyan (C) ink, in succession. In the printing and recording operation, the printing and recording time $P_t$ of an image is:

$P_t = t_s \times S \times T \times U \times$(number of scanning lines)×(number of kinds of ink)+β, being the fundamental operating equation, where $t_s$ is the heat generation control reference time, and
D is the sum of the image receiving sheet supplying and removing time, the recording preparatory time, etc.

(2. Heat generating drive of the thermal head)

Figure 5:
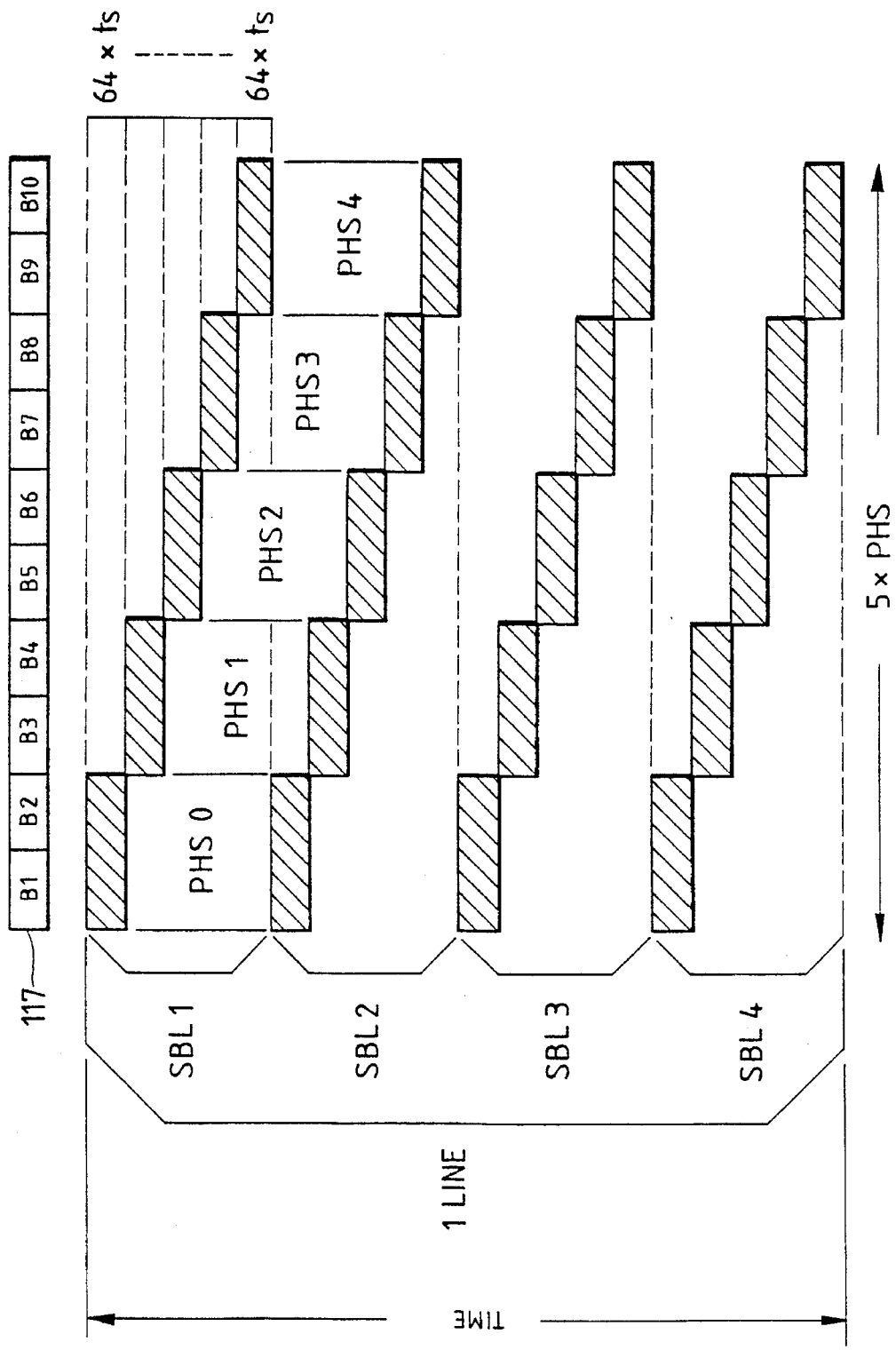
FIG. 5 is an explanatory diagram outlining the heat generation control of the thermal head.

Heat generation control, according to the above-described fundamental operating equation, is given to the thermal head. The heat generation control is as outlined in FIG. 5. The thermal head 117 is made up of ten blocks B1 through B10 each including sixty-four (64) heat-generating resistors. For convenience in description, it is assumed that the blocks B1 and B2 are driven simultaneously, the blocks B3 and B4 are driven simultaneously, the blocks B5 and B6 are driven simultaneously, and so forth. In FIG. 5, each shaded portion represent the "on" drive time of the respective heat generating resistors; the heat generation control of the blocks B1 and B2 is effected with PHS0 with SBLs, the heat generation control of the blocks B3 and B4 is carried out with PHS1 with SBLs, and so on; and the portions other than the shaded portion represent the forcible "off" drive time. The heat generation control is carried out for the time of 64×$t_s$ per SBL, and therefore in one LIN, the time of 256×$t_s$ is assigned to one heat-generating resistor. That is, the heat generation control is so effected that the printing and recording of one picture element is carried out 256 SLTs to show sixty-four (64) gradation. The effect and object of the thermal control with one line divided into four sub-lines are to repeatedly write sub-lines thereby to eliminate the formation of the white stripe attributing to the block division type drive. This has been described in detail in the specification of Japanese Patent Application No. 254203/1985 which has been filed by the present applicant.

FIGS. 4 and 5 relate to each other as follows: In FIG. 4, the R frequency divider determines the heat generation control reference time $t_s$ of the thermal head 117. The S frequency divider 43 determines the maximum duration time in one heat generation control. The T frequency divider 44 determines the number of phase drives; that is, the number of blocks for division. The U frequency divider 45 determines the number of sub-lines. Described above is the relation between a clock generating method and a thermal head driving method with respect to one line.

(3. Brief description of the signal processing operation)

The signal processing device according to the invention performs fundamental processes such as (1) a DATA inputting process, (2) a DATA transfer requesting process, (3) a HEAD-DATA transferring process, (4) a color conversion process from R, G and B image data to Y, M and C printing density, and (5) an aperture correction process for quantization data.

Figure 6:
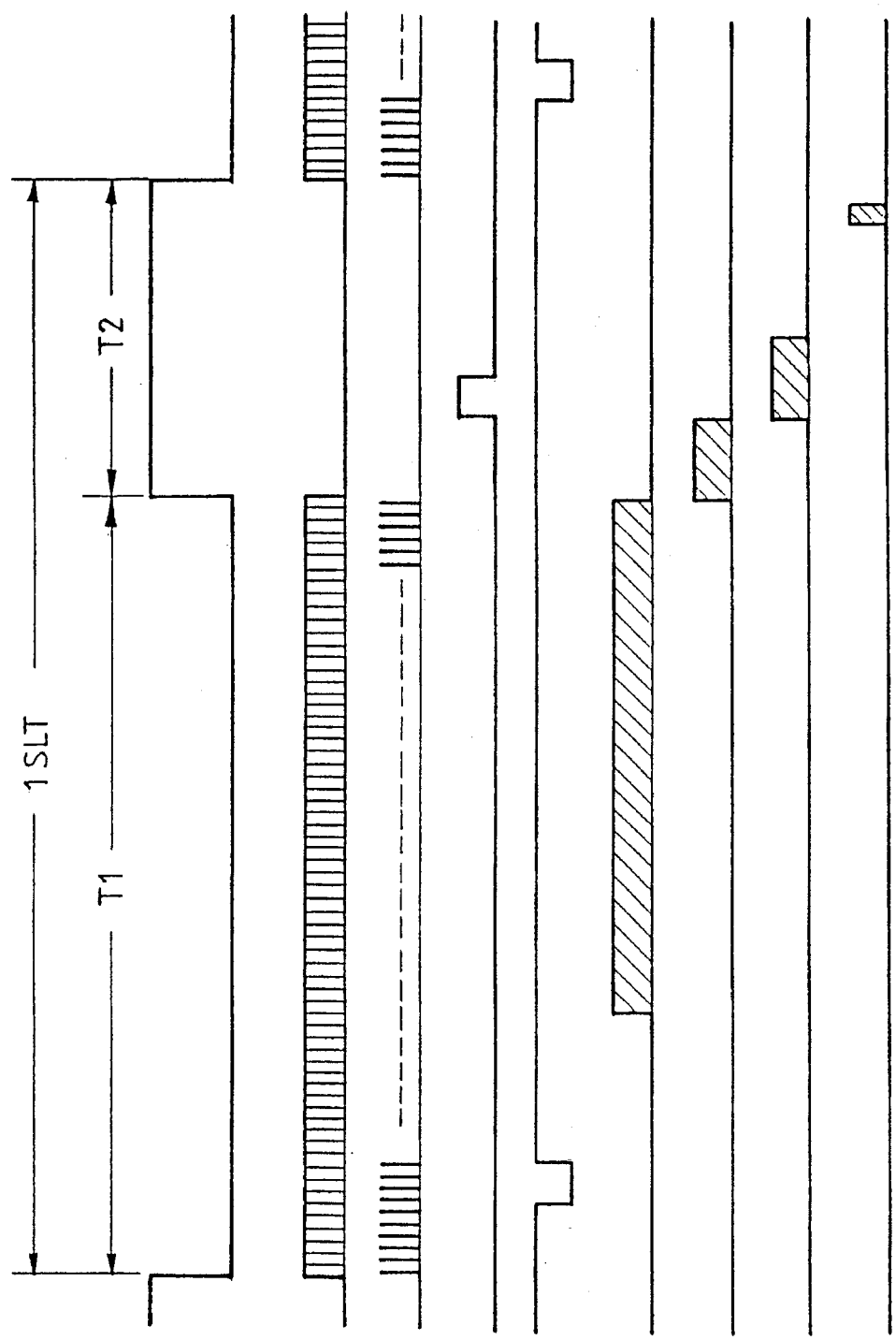
FIG. 6 is a fundamental time chart illustrative of the operation of the device according to the invention.

FIG. 6 outlines the timing of those processes. In FIG. 6, the part (a) shows one SLT consisting of intervals T1 and T2, which is the fundamental interval for processing. The fundamental interval occurs repeatedly to achieve the processing of one line. The part (b) of FIG. 6 shows the transfer of HEAD-DATA carried out during the interval T1 in the part (a) of FIG. 6. Heat generation data is transferred to one of the five combinations of the signals HD1 through HD10, while an "off" signal (normally "0") is transferred to the remaining four combinations of signals. In this case, since one block is of 64 bits, the transfer data is also of 64 bits. However, since two blocks are driven at the same time, 128 bits are transferred as a whole. The part (c) of FIG. 6 shows the CLK signal in the HEAD-CONT which is used to transfer the HEAD-DATA shown in the part (b) of FIG. 6 to the shift register in the thermal head 117. Similarly as in the data, the CLK signal consists of sixty-four (64) pulses. The part (e) of FIG. 6 shows the general position of the LTH signal in the HEAD-CONT which is to temporarily store in a latch circuit group in the rear stage the data transferred to the shift register in the thermal head 117. In synchronization with the LTH signal, head generation is turned on and off. The part (e) of FIG. 6 shows the general position of the $\overline{\text{REQ-CLK}}$ (FIG. 1) which requests for the transferring of the R, G and B image data of a picture element, each quantized with 6 bits. The part (f) of FIG. 6 shows the allowable position of R, G and B image data inputted in response to the request of the $\overline{\text{REQ-CLK}}$ signal (the part (e) of FIG. 6). The part (g) of FIG. 6 shows a color conversion process performing position. The part (h) of FIG. 6 shows an aperture correction arithmetic operation performing position.

As is apparent from the above description, during the interval T1, the transfer of HEAD DATA, the request for DATA, and the inputting of DATA are carried out; and during the interval T2, the latch control of the thermal head 117, the color conversion process and the aperture correction arithmetic operation are performed.

The processes shown in FIG. 6 are for only one SLT. As for one line, the transfer of HEAD-DATA is carried out continuously (S×T×U=64×5×4)=1280 times, and the inputting of DATA, sixty-four (64) times corresponding to the number of picture elements of one line.

(4. Summary of the color conversion)

Color conversion is one of the most important techniques for the device which prints or records in color, according to a YMC (yellow, magenta and cyan) subtractive color mixing method, the color image which is expressed according to an RGB (red, green and blue) additive color mixing method. It will be described according to the "color conversion method" disclosed by Japanese Patent Application No. 60520/1987 filed by the present applicant.

Figure 7:
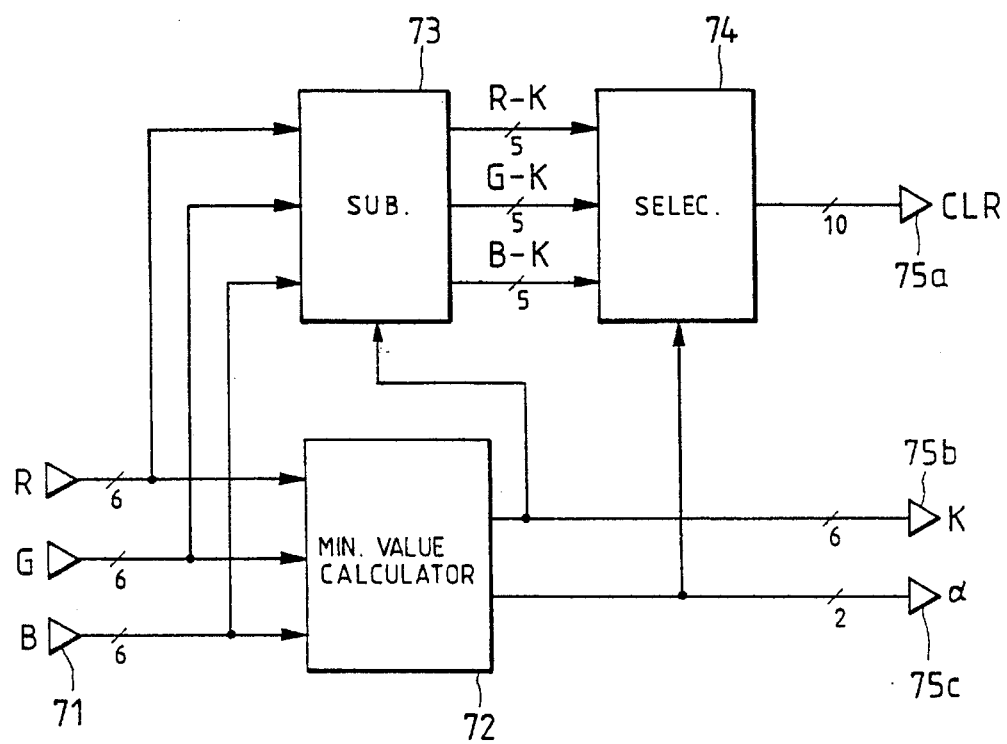
FIG. 7 is a diagram illustrative of the color conversion performed in the invention.

In the embodiment shown in FIG. 1, essential components for color conversion are the picture element resolver 5, the MPX circuit 7, the color conversion table block of the ROM of the memory 8, and the arithmetic unit 9. FIG. 7 shows one example of the picture element resolver 5. In FIG. 7, reference numeral 71 designates input terminals for the data of one picture element of R, G and B; 72, a minimum value calculator with K=MIN (R, G, B); 73, a subtracter; 74, a selector; and 75a, 75b and 75c, output terminals for three picture element resolution signals.

The operation of the picture element resolver 5 is as follows: The R, G and B data (each being 6 bits) at the input terminals 71 are applied to the minimum value calculator 72 and the subtracter 73. The minimum value Calculator 72, comprising a digitalized comparator and a selector, outputs K=MIN (R,G,B) and a code α (2 bits) indicating which of the R, G and B data is the minimum (=K). The data K corresponds to the achromatic color component of a color image, and is of 6 bits. The subtracter 73, receiving R, G, B and K, performs subtractions (R-K), (G-K) and (R-K), and outputs the results of the subtractions which are rounded into 5 bits. These three signals correspond to the color components (saturation and hue) of the color image. The rounding of the results of the subtractions is to compress the capacity of the ROM of the memory 8. Since one of the three signals is zero (0), the zero term is eliminated by the selector 74. That is, the following values CLR are selectively outputted according to the code α:

With K=B, CLR=(R-K) $2^5$+(G-K)

With K=G, CLR=(R-K) $2^5$+(B-K)

With K=R, CLR=(G-K) $2^5$+(B-K)

The CLR signals are of 10 bits. The picture element resolver 5 operates as described above, to output the feature extraction signals CLR, K and α of an RGB image.

FIG. 8 shows one example of the detailed address map of the color conversion table of the ROM in the memory 8. As shown in FIG. 8, an address A14 has a color conversion table section code; addresses A13 and A12, selection codes for the partial color conversion of the color component with the minimum signal specifying codes α ("00", "01" and "10") and for the partial color conversion of achromatic color component with the fixed code "11"; addresses A11 and A10, selection codes consisting of YMC printing ink specifying codes in successive color printing and recording operation and a code k for obtaining the achromatic color components which secondarily accompany color components; and addresses A9 through A0 of ten (10) bits, correction value k' obtained from k, CLR and k. Each address has data of 1 byte, having a capacity of about 128 bits.

The conversion procedure comprises the following four steps: In step (1), the code α, the ink specifying code, and the composite signal CLR are used to provide the partial data $y_1/m_1/c_1$ as to color components. In step (2), the code α, the code k ("11") and the composite signal CLR are used to obtain the correction data k' (being 4 bits) of achromatic color components. In step (3), the code a (="11"), the ink specifying code, the correction value k' and the achromatic color component k are used to provide the partial data $y_2/m_2/c_2$ as to achromatic color components. In step (4), the final color conversion data y/m/c is calculated through the additions of the above-described partial data $y=y_1+y_2$ /m=$m_1+m_2$/c=$c_1+c_2$. The data y/m/c are printing ink density data for picture elements.

(5. Outline of the picture element arithmetic operation)

The picture element arithmetic operation is carried out by the arithmetic unit 9. The arithmetic operation includes (1) addition, and (2) aperture correction arithmetic operation. The addition is carried out with an adder. The aperture correction arithmetic operation will be described. In general, the analog aperture correction for television signals is carried out in a frequency band of from 1 MHz to 4 MHz. On the other hand, in quantizing each horizontal scanning line of NTSC system television signals with 640 picture elements, the sampling frequency is about 12.5 MHz. Therefore, if the aperture correction arithmetic operation is carried out with the quantization data having a peak value in a range of from 1 MHz to 4 MHz, then the peak frequency is 3.12 MHz. The frequency is close to the color carrier frequency 3.58 MHz, thus being disadvantageous in that, although the resultant image is improved in sharpness, the color carrier frequency is clearly printed in the form of dots. It is considered that this difficulty attributes to the fact that the image reproduced on a television set is rather difficult to sufficiently recognize because it is moving. However, when the one shot is printed, it is a still picture which can be readily recognized.

An aperture correction arithmetic operation which is free from the above-described difficulty will be described with reference to FIG. 9.

Figure 9:
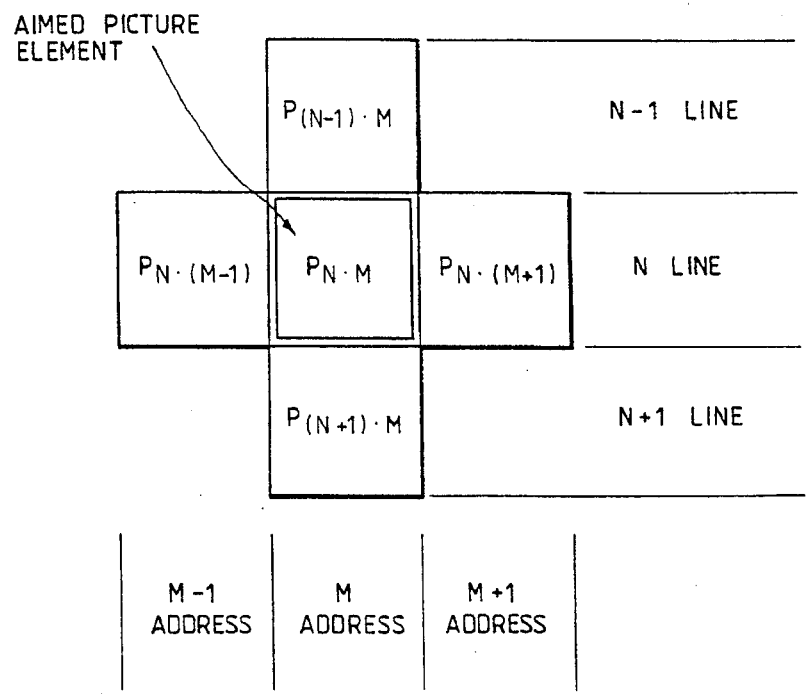
FIG. 9 is an explanatory diagram illustrative of one example of an aperture arithmetic operation method employed in the invention.

In FIG. 9, reference character $P_{NM}$ designates an aimed picture element. The aimed picture element and other four picture elements are utilized to perform, for instance, the following arithmetic operation, to obtain an aperture correction value $D_A$:

$$D_A = 1.5 \times P_{NM} - 0.125(P_{(N-1)M} + P_{N(M-1)} + P_{N(M+1)} + P_{(N+1)M})$$

As for data such as $P_{NM}$, the printing in density data y/m/c through color conversion are used. This is to eliminate the difficulty that, with image data before color conversion, arithmetic operations must be carried out in a parallel mode for R, G and B data, with the result that the circuitry becomes intricate and the processing time is increased. In the arithmetic operation, data for three lines are required, and therefore the memories LB I, LB II and LB III in the SRAM of the memory 8 are used as temporary storing memories.

Figure 10:
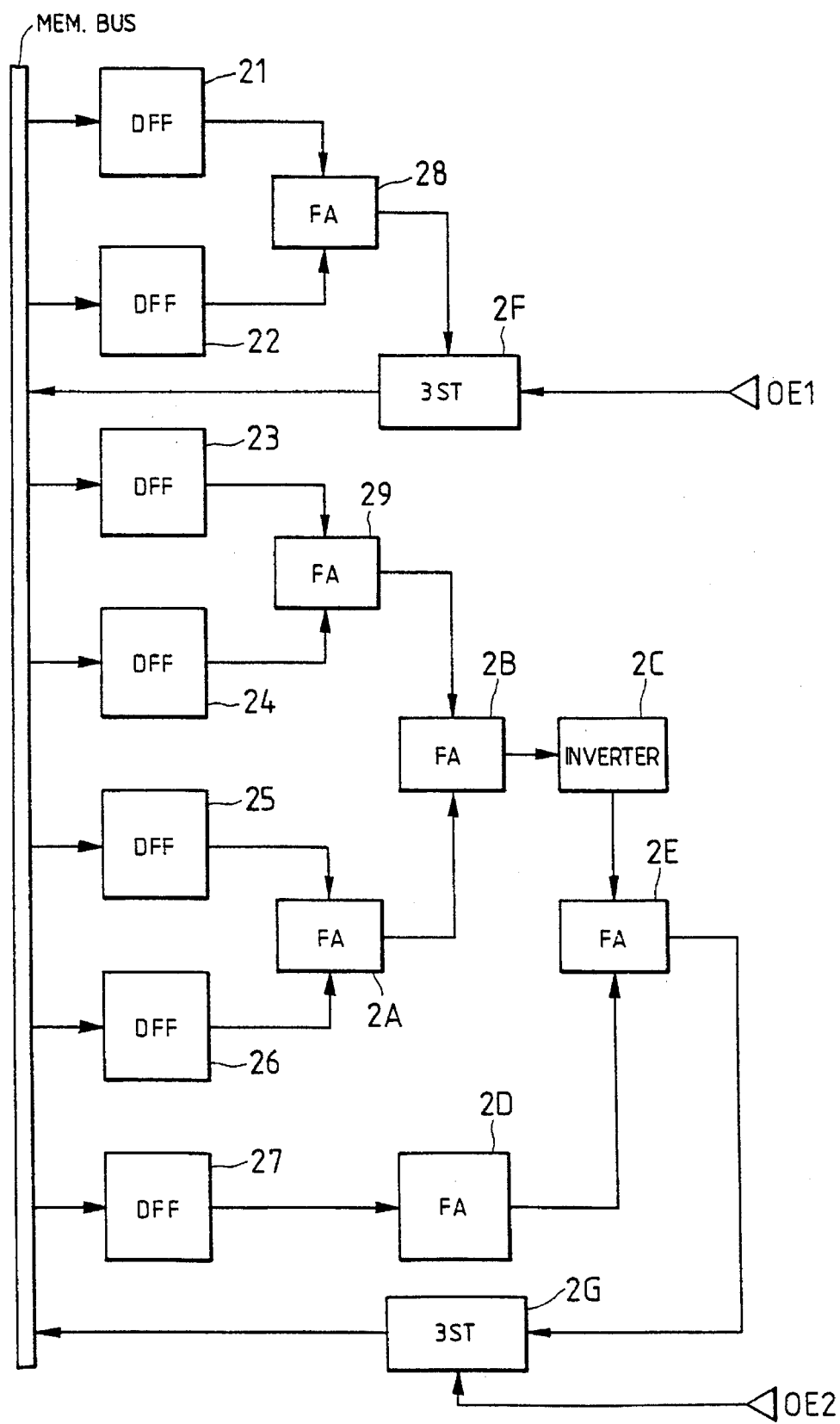
FIG. 10 is a block diagram showing one example of an arithmetic unit shown in FIG. 1.

FIG. 10 shows the arrangement of the arithmetic unit 9. In FIG. 10, reference numerals 21 through 27 designate D type flip-flops for storing data of 1 byte hereinafter referred to merely as "DFFs 21 through 27", when applicable); 28, 29, 2A, 2B, 2D and 2E, full adders (hereinafter referred to merely as "FAs 28, 29, 2A, 2B, 2D and 2E", when applicable); 2C, an inverter; and 2F and 2G, three-state output buffers (hereinafter referred to merely as "3STs 2F and 2G", when applicable). In addition, a memory bus BUS, and bus control signals OE1 and OE2 for activating the three-state output buffers and transferring the results of arithmetic operations to the memory bus BUS are employed.

The operation of the arithmetic unit 9 is as follows: The DFFs 21 and 22 and the FA 28 are provided for addition. For instance, when the color component partial data $y_1/m_1/c_1$ described in paragraph 4 (Summary of the color conversion) are temporarily stored in the DFF 21, and the achromatic color component partial data $y_2/m_2/c_2$ are temporarily stored in the DFF 22, then the results of addition $y=y_1+y_2/m=m_1+m_2/c=c_1+c_2$ are outputted by the FA 28. The results of the addition is transferred to the memory bus BUS with predetermined timing with the aid of the bus control signal OE1 of the 3ST 2F.

Next, the density data $P_{(N-1)M}$, $P_{N(M-1)}$, $P_{N(M+1)}$ and $P_{(N+1)M}$ are temporarily stored in the DFFs 23, 24, 25 and 26, respectively. These density data are added by means of the FA2 29 and 2A, and the FA 2B. The result of addition corresponds to a term of subtraction, so that the complementary operation of "1" is carried out by the inverter 2C. On the other hand, the density data $P_{NM}$ is temporarily stored in the DFF 27, and is multiplied by a factor 1.5 in the FA 2D. The FA 2E uses the density data and the result of the complementary operation of "1", to perform the complementary addition of "2" according to the arithmetic equation. In this operation negative values are rounded to "0". This is the aperture-corrected density data $D_A$. The density data $D_A$ is also transferred to the memory bus BUS with the aid of the bus control signal OE2. The DFFs need fetch signals; however, the description of them is omitted for purposes of simplification of the description.

The arithmetic unit 9, being designed as described above, will improve the sharpness of high frequency components which is lowered through quantization.

(6. Formation of the head drive data)

The driving of the thermal head has been outlined in paragraph 2 (heat generation drive of the thermal head), and therefore formation of the head drive data will be described here. This process concerns the head driver 10 and the ROM and the SRAM of the memory 8, and uses the gradation table of the ROM and the head buffers HB I and HB II of the SRAM. Simply stated, the gradation table should have a capacity of 56 bytes, because sixty-four (64) gradations are obtained through the heat generation control of the resistors with 256 SLTs. However, the printing and recording temperature is greatly changed because of the heat generation of the thermal head itself, and the ambient temperature of the printing and recording machine is also greatly changed, for instance, by seasonal variation, as a result of which the resultant print or record is not uniform is density (OD value), and the gradation characteristic is changed, so that false contours are formed, or the gray balance is lowered; that is, the picture quality is lowered. In order to overcome this difficulty, it is necessary to detect the temperature of the thermal head thereby to perform the thermal control according to the temperature thus detected.

In the gradation table in the ROM shown in the part (a) of FIG. 2, the address is made up of an ink specifying code $T_y$, of the two most significant bits, a temperature code $T_c$ of 4 bits, and w gradation code of 8 bits for each color and each temperature code; that is, the address made up of 14 bits. The ink specifying code $T_y$ is to indicate which of the Y, M and C ink sheets is used for printing. The temperature code $T_c$ is a signal which is formed by quantizing with 4-bits $t_s$ the output of the temperature sensor 118 provided for the thermal head 117.

The above-described conversion is carried out by a Circuit other than that of set forth in the invention, and uses the data inputted to the data distributor 3 through the DATA line. The gradation code is obtained by coding the value which is provided by repeating for each of PHS0 through PHS4, five times, the numerical values 0 to 63 with SBL1 (FIG. 5), the numerical values 64 to 127 with SBL2, the numerical values 128 to 191 with SBL3, and the numerical values 192 to 255 with SBL4. In practice, the gradation code is obtained by combination of the outputs f3 and f5 of the S frequency divider 43 and U frequency divider 45 (FIG. 4). Such gradation data for the addresses are obtained by coding 0 through g (g being the positive integer equal to or higher than the number of gradations). A method of setting the data has been disclosed in detail by Japanese Patent Application No. 145484/1986, entitled "Image Printing Machine", filed by the present applicant.

The gradation table of the ROM has been described. Now, a method of using the head buffers HB I and HB II of the SRAM will be described. The two line buffers are to use a read (hereinafter referred to merely as "RD", when applicable) operation mode and a write (hereinafter referred to merely as "WR", when applicable) operation mode alternately every line. When one of the head buffers is used in an RD mode (which is a thermal head data forming mode), the other is used in a WR mode (which is a density data $D_A$ storing mode after the aperture correction). In the RD mode, in order to drive the two blocks of the thermal head 117 simultaneously, data for two blocks are read in a multiplex mode at a speed twice as high as the speed of transferring data to the thermal head.

Figure 11:
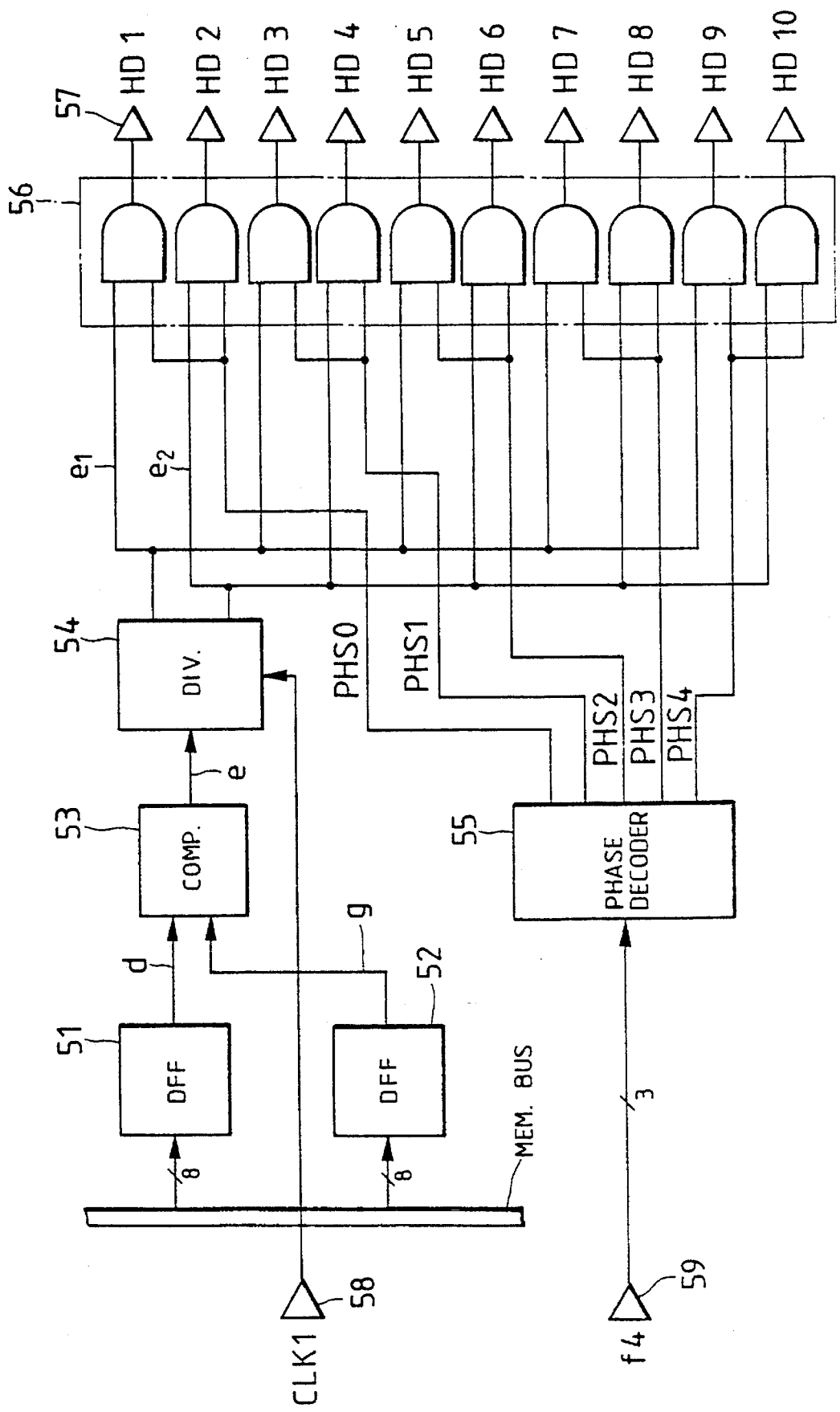
FIG. 11 is a block diagram showing one example of a head drive unit shown in FIG. 1.

The above-described arrangements and the above-described methods of using the ROM and the SRAM having been considered, the head driver 10 shown in FIG. 11 will be described. In FIG. 11, reference numerals 51 designates a DFF for temporarily storing the RD multiplex density data d of the SRAM; 52, a DFF for temporarily storing a gradation data g provided by the ROM; 53, a digital comparator; 54, a dividing unit for dividing a multiplex comparison result into two signals by using a dividing signal CLK1; 55, a phase decoder for receiving the output signal f4 of the T frequency divider 44 in FIG. 4 to form phase drive signals; 56 a head data block distributor comprising a number of AND circuits; and 57, output terminals for data HD1 through HD10 forming the data HEAD-DATA, the output terminals being connected to the thermal head 117 in FIG. 3. Further in FIG. 11, reference numeral 58 and 59 designate input terminals for the dividing signal CLK1, and the phase signal f4, respectively.

The operation of the head driver 10 will now be described.

The gradation data g is temporarily stored in the DFF 52 with the timing shown in the part (i) of FIG. 6. One hundred and twenty-eight (128) RD density data d for two blocks from the SRAM are temporarily stored in the DFF 51 successively. The two kinds of data g and d are subjected to comparison by the comparator 53. When d≧g, the comparator outputs a comparison result e of "1", and when d<g, it outputs a comparison result e of "0". The dividing unit 54 divides the comparison result into data trains $e_1$ and $e_2$ by using the dividing signal CLK1. On the other hand, the phase decoder 55 receives the output signal f4 of the T frequency divide 44. The phase decoder outputs block selecting signals by raising a phase signal PHS0 to "1" with f4=0, a phase signal PHS1 to "1" with f4=1, a phase signal PHS2 to "1" with f4=2, a phase signal PHS3 to "1" with f4=3, and a phase signal PHS4 to "1" with f4=4, and by setting them to "0" otherwise.

In the block distributor 56, the head drive data trains $e_1$ and $e_2$ and the block selecting signals are ANDed as shown in FIG. 11, so that, when the block selecting signal is at "1", the head drive data trains e1 and e2 are passed, and when it is at "0", all the outputs are set to "0". Thus, the output signals HD1 through HD10 at the output terminals 57 are distributed as indicated in FIG. 12. As is apparent from FIG. 12, two blocks are activated at any phase interval, and therefore the printing or recording operation can be achieved with one-fifth (⅕) of the power consumption used in the case where all the blocks are driven simultaneously.

(7. Summary of the memory control)

This concerns the memory 8, the address generator 6, and the clock generator 4 in the embodiment shown in FIG. 4.

Figure 13:
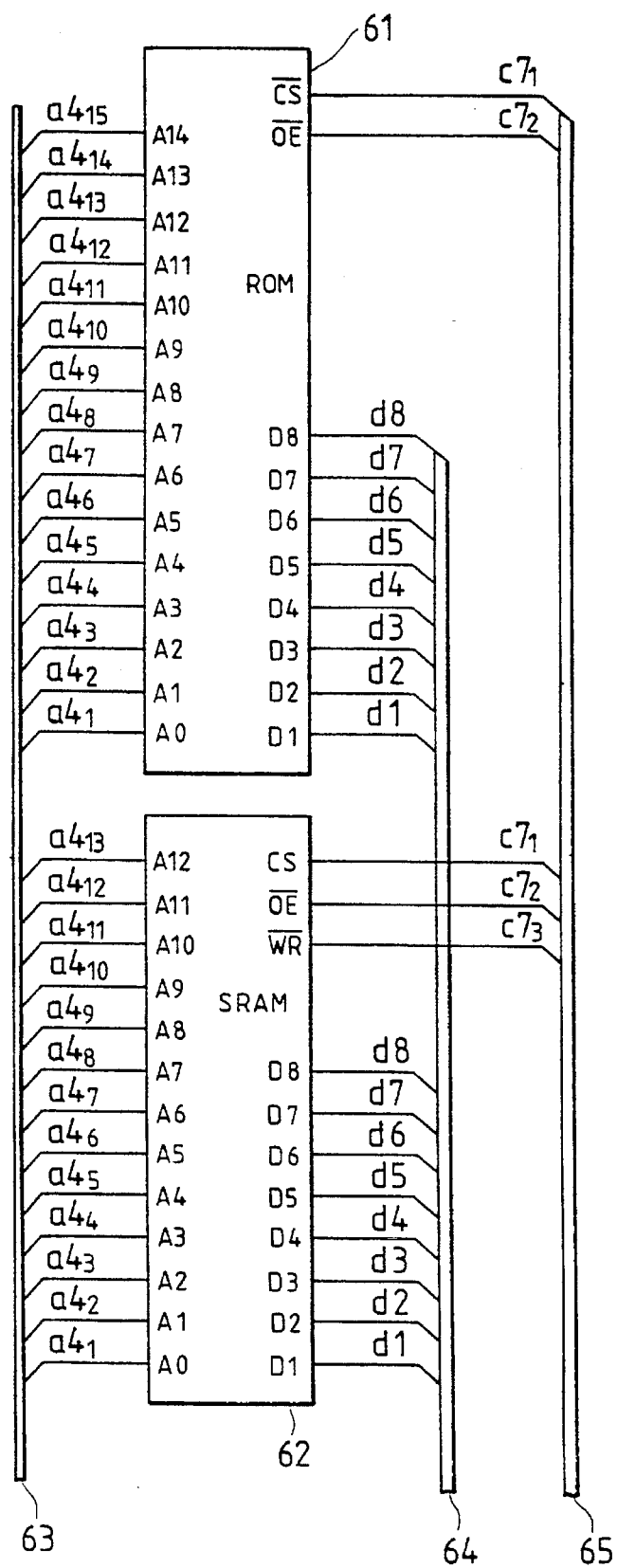
FIG. 13 is an explanatory diagram showing one example of the connection of an SRAM and a ROM.

In the ROM and the SRAM of the memory 8, the address terminals and the data terminals thereof are connected in common, for the purpose of reducing the number of connecting lines, and it is impossible to make simultaneous access to them. On the other hand, the arithmetic unit 9 is so designed that it receives density data from the data bus BUS, and in addition, transmits arithmetic results to the data bus BUS. FIG. 13 shows one example of the memory 8. In FIG. 13, reference numeral 61 designates a ROM; 62, a SRAM; 63, an address signal line; 64, a data bus line; and 65, a control signal line. Further in FIG. 13, reference characters A0 through A14 designate address terminals; D1 through D8, data terminals; CS and $\overline{CS}$, and $\overline{OE}$ and $\overline{WR}$, control terminals. Thus, the circuit elements are commonly used as much as possible. The ROM 61 is of 256 K bits, and the SRAM is of 64 K bits. They perform memory sections with chip select signals (at the terminals CS and $\overline{CS}$), and the three-state control of data terminals with output enable signals (at the terminals $\overline{OE}$). In addition, the SRAM 62 uses Rd and WR control signals (at the terminal $\overline{WR}$). It should be noted that the SRAM 62 operated at parts of the intervals T1 and T2 in FIG. 6, whereas the ROM operates only at a part of the interval T2. The address signal line 63 is connected to the MPX circuit, the data bus line 64 is connected to the MPX circuit 7, the arithmetic unit 9 and the head driver 10, and the control signal line 65 is connected to the clock generator 4.

Now, the address generator 6 will be described.

The address generator 6 operates to form (1) the WR address signals, to the line buffers, of density data obtained through color conversion, (2) RD address signals from the line buffers, for aperture correction, (3) the WR address signals, to the head buffers, of density data through aperture correction, (4) RD address signals from the head buffers, and (5) gradation table RD address signals from the ROM.

The address signal of (1) consists of a signals of ten (10) least significant bits increasing every SLT, and a 3-bit bank selection signal changing every line. The address signal of (2) consists of the address signals of the (M−1)-th, M-th and (M+1)-th addresses in the N-th line, and the address signals of the M-th addresses in the (N−1)-th and the (N+1)-th lines, with respect to the operation of the aimed picture element at the M-th address in the N-th line. The address signal of (3) consists of a 10-bit signal increasing every SLT, and a 3-bit bank selection signal. The address signals of (4) consists of a 10-bit signal which is combination of a 7-bit signal alternately multiplexing addresses 0 through 63 and addresses 64 through 127 and 3-bit phase specifying signal, and a 3-bit bank selecting signal changing every line. The address signal of (5) consists of an 8-bit signal obtained by combining 0 through 63 SLT signals and 2-bit sub-line specifying signals. These address signals can be readily formed with counters, latch circuits, address, etc.

(8. Data inputting)

Figure 14:
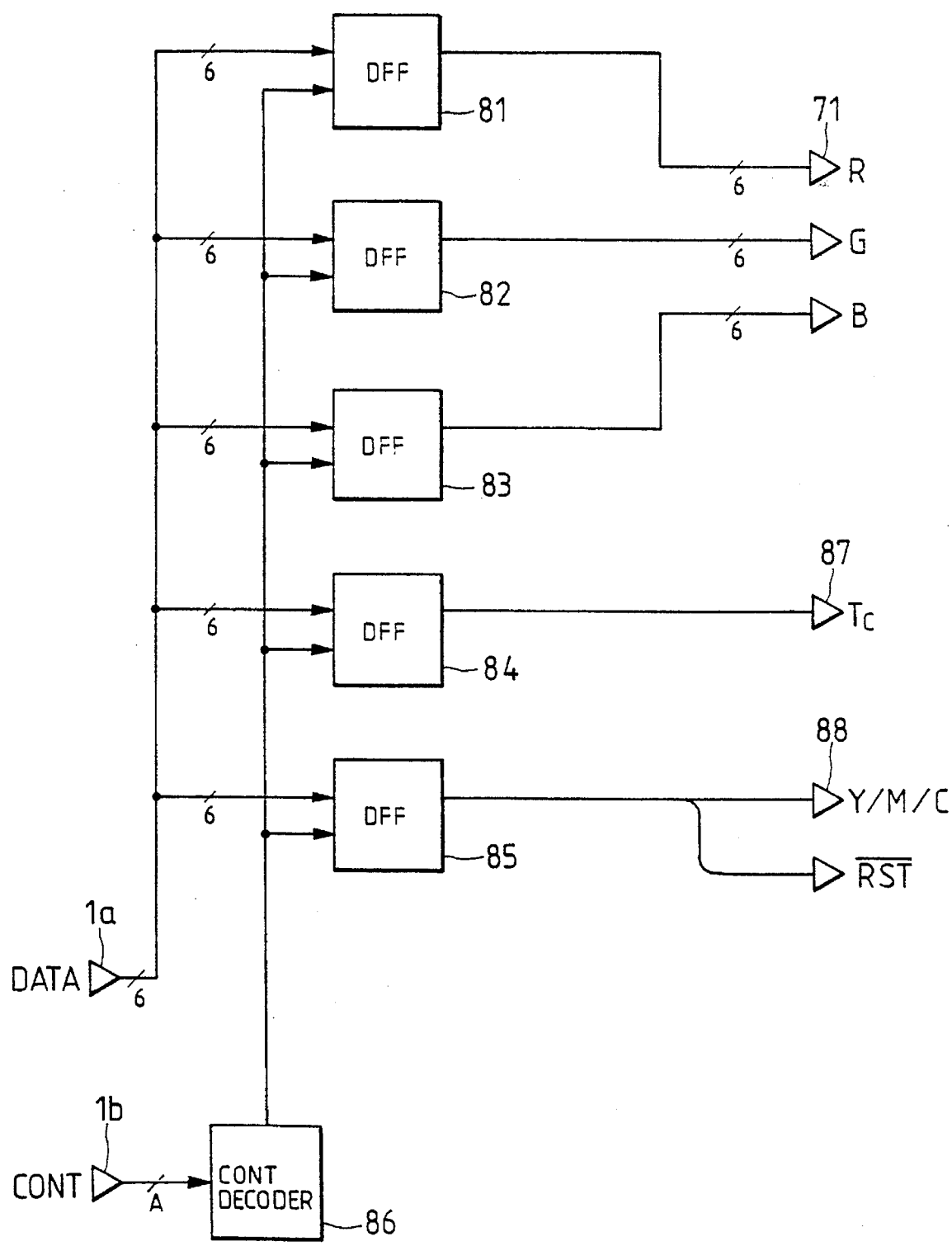
FIG. 14 is a block diagram showing one example of a data distributor shown in FIG. 1.
Figure 15:
FIG. 15 is an explanatory diagram showing one example of the relation between input data and control data for data distribution.

This concerns the data distributor 3 and the clock generator 4. FIG. 14 shows one example of the arrangement of the data distributor 3. In FIG. 14, reference numerals 81 through 85 designate 6-bit DFFs; 86, a CONT decoder; 87, an output terminal for the temperature code $T_c$; and 88, output terminals for an ink specifying code Y/M/C and a reset signal RST. FIG. 15 shows relationships between DATA and CONT. The DATA consists of 6 bits, DT1 through DT6, and the CONT consists of identifying codes CNT1 through CNT3, and an STB signal for fetch timing. The DATA and the CONT relates to each other as shown in FIG. 15. As shown in FIG. 14, the DATA at the terminal 1a is connected in parallel to the first input terminals of the DFFs 81 through 85. On the other hand, the CONT at the terminal 1b is applied to the CONT decoder 86, the output of which is fetched by the DFF with the STB signal to which the DATA corresponds according to the value specified by the CNT1 through CNT3 of the CONT.

As a result, R, G and B image data for one picture element, each being of six (6) bits, are provided at the terminals 71, the temperature code $T_c$ is provided at the terminal 87, and the reset signal RST and the ink specifying signal Y/M/C are provided at the terminals 88. Signals other than those described above are all inputted through the data distributor 3, so as to be distributed to the respective circuit elements.

The whole operation of the signal processing device thus organized will be described.

First, initial conditions for printing and recording are set, as the DATA and the CONT from the terminals 1a and 1b are set in the data distributor 3. As for the initial conditions, Y="00" for specifying printing ink, and a temperature code Tc="0111" are set. This means that initially the printing operation is carried out with Y ink, and it is estimated that the temperature is about 30° C. Then, the reset signal RST is set to "0", and is then applied to the clock generator 4, etc. through the signal line a2, thereby to initialize all the circuits. The reset signal $\overline{RST}$ is raised to "1", to start all of the operations. Under this condition, the signal $\overline{REQ}$ at the terminal 2a is set to "0", and the signal $\overline{REQ\text{-}CLK}$ at the terminal 2b is set to "0" with the timing shown in the part (e) of FIG. 6, thus requesting the transfer of one picture element. In response to this requisition, R, G and B image data, each being of 6 bits, are successively set in the DFFs 81, 82 and 83 in the data distributor 3, respectively (the part (f) of FIG. 6). The three data are supplied through the terminals 71 to the picture element resolver 5, where they are resolved into a color component CLR, achromatic color component K, and minimum signal specifying code a, which are applied through the signal line a3 to the MPX circuit 7. Under this condition color conversion is carried out with the timing shown in the part (g) of FIG. 6.

The MPX circuit 7 sets "1" as the table code, and selects the code Q and CLR signal in the signal a3 and the ink specifying code Y="00" in the signal a1 of the data distributor 3, thus forming an address signal a4 as shown in FIG. 8. The address signal a4 is applied to the memory 8. In a predetermined access time, a partial density data $y_1$ is obtained. The partial density data $y_1$ is temporarily stored in the DFF 21 in the arithmetic unit 9. Next, with respect to the ink specifying code of the address signal a4, with k="11", a correction value k' is obtained from the signal line a5. The value k', the data K on the signal line a3, the component K, and the code α="11" are used to form the address signal a4 as shown in FIG. 8, thereby to obtain data $y_2$. The data $y_1$ and $y_2$ are added by the FA 28, thus providing density data y. Thus, the color conversion has been accomplished. The density data y thus provided is transferred to the memory bus BUS through the 3ST 2F, and written in the 0-th address of the LB I in the SRAM of the memory 8. In this operation, as for the address signal a4, out of the plurality of address signals a6 formed by the address generator 6, one selected by the MPX 7 for the line buffer write signal is provided. The clock generator 4 applies an ARM writing operation signal to the control signal line a7.

Next, with respect to the part (h) of FIG. 6, the aperture correction arithmetic operation is carried out according to the method described in (5. Outline of the picture element arithmetic operation), and the arithmetic result is stored in the 0-th address in the HB I of the SRAM in the memory 8. In this case also, for the address signal a4, predetermined ones of the plurality of address signal a6 formed by the address generator 6 are successively selected and outputted by the MPX circuit 7. And, the clock generator 4 applies predetermined operating signals to the signal lines a7.

Next, with respect to the part (i) of FIG. 6, gradation data is set. That is, the temperature code Tc set in the data distributor 3 from outside is applied through the signal line a1 to the MPX circuit 7, so that the table code "0", 2-bit ink specifying code, 4-bit Tc, and 8-bit gradation code described in (6. Formation of the head drive data) are used to form an address signal a4. The control signal a7 provided by the clock generator 4 so as to select the ROM of the memory 8 is used to transfer the gradation data from the ROM's gradation table section to the memory bus BUS. The gradation data is temporarily stored in the DFF 52 in the head driver 10, thus making preparation for the formation of head drive data at the next interval $T_1$.

Thus, an input signal processing operation for RGB images per SLT has been accomplished. This processing operation is repeatedly and continuously carried out for 640 picture elements, to achieve an input signal processing operation for one line. In synchronization with this achievement of the input signal processing operation, the signal $\overline{REQ}$ is raised to "1", and the generation of the pulse signal $\overline{REQ\text{-}CLK}$ is suspended to release the request for the transfer of RGB data.

For the next line, with the line buffer LB II and the head buffer HB II selected in the memory 8, the above-described operations are carried out again. Thereafter, the line buffers are used in the order of LB III, LB I, LB II, and LB III, and the head buffers are used in the order of HB I, HB II, and HB I until the printing and recording operation with Y in is accomplished. The aperture correction arithmetic operation uses density data for three lines, and therefore the heat generation drive of the thermal head can be made beginning with the fourth line. The printing storage on the fourth line is performed on the RD (read) data of the head buffer HB I which has stored the aperture correction value of the third line.

An output signal processing operation for the heat generation drive of the thermal head will be described.

The output signal processing operation includes reading density data from the head buffers in the SRAM of the memory 8, and forming the data HEAD-DATA with density data and gradation data, and is carried out continuously in 1,280 SLT intervals in one line.

For the first three lines (1≦N≦3), in the head driver 10, all the outputs of the phase decoder 55 are set to "0", so that the data HEAD-DATA are all at "0"; that is, no heat generation is carried out. For the fourth line, the address generator 6 successively forms RD (read) address signals for the blocks B1 and B2 which are of 1≦M≦64, and 65≦M≦128. The RD address signals are alternately multiplexed by the MPX circuit 7 into a compound address signal a4. In a predetermined access time, 128 density data are provided at the data bus BUS, and are successively and temporarily stored in the DFF 51 in the head driver 10. On the other hand, the gradation data of the 0-th address has been set in the DFF 52 of the Head driver 10, and the HEAD-DATA indicated at PHS0 in FIG. 12 is outputted according to the operation described in (6. Formation of the head drive data). Next, the gradation data at the first (1st) address is read out of the ROM in the memory 8, and the density data of the blocks B1 and B2 are read, so that the HEAD-DATA is formed and outputted according to the operation described in (6. Formation of the head drive data). The above-described operation is repeatedly carried out until the sixty-third (63rd) address is reached. Thus, the generation drive with PHS0 in SBL1 in FIG. 5 has been accomplished. Thereafter, with PHS1, density data of $129 \leq M \leq 256$ are used; with PHS2, density data of $257 \leq M \leq 512$ are used; and with PHS4, density data of $513 \leq M \leq 640$ are used. And, in each of the cases, they are compared with gradation data at the 0-th through 64-th addresses, whereby the that generation rive of the corresponding blocks is carried out. Thus, the printing and recording operation of SBL1 has been accomplished. For SBL2, gradation codes of 64 through 127 are used; for SBL3, gradation codes of 128 through 191 are used; and for SBL4, gradation codes of 192 through 255 are used, in such a manner that, similarly as in the case of SBL1, the heat generation drive is continuously carried out with the density data M successively changed. Thus, the printing and recording operation of one line has been achieved. With N=5, the head buffer HB II of the SRAM of the memory 8 is used (the density data of N=6 being written in the head buffer HB I), and the operations with N=4 are successively carried out, so as to accomplish the printing and recording operation. The printing and recording operation is carried out for 480 lines in total in the above-described manner. Thus, the printing and recording operation with Y ink has been achieved.

Next, initial conditions M="01" and temperature code Tc are set, and a printing and recording operation with M ink is carried out.

A printing and recording operation with C ink is carried out similarly. Thus, the printing and recording operation of one image has been achieved. In this case, the R, G and B image data equal in content are inputted to the data distributor 3 every three inks.

The above-described input signal processing operation and output signal processing operation are carried out in synchronization with each other, so that the printing and recording of a picture expressed in R, G and B is accomplished by using Y, M and C inks.

The fundamental operations of the signal processing device has been described. Now, a method of increasing the function of the device will be described.

(Function 1. Variation of the printing and recording conditions)

Figure 16:
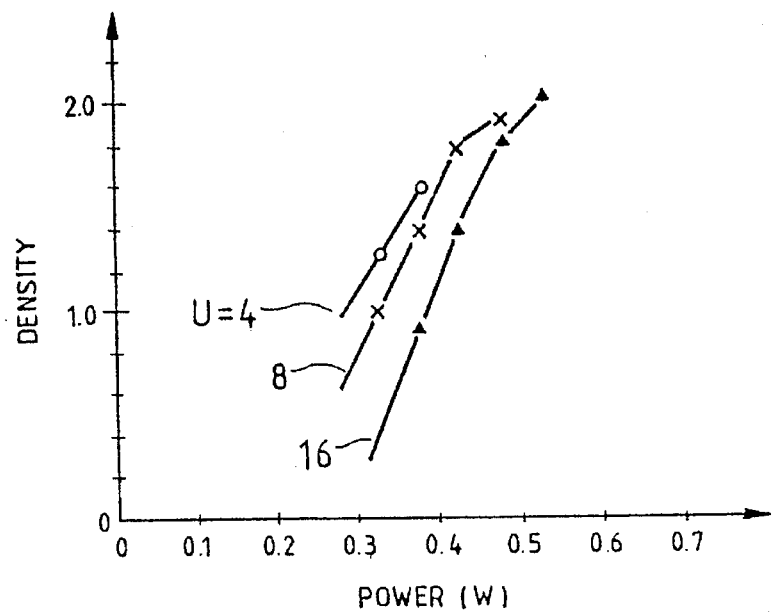
FIG. 16 is a diagram showing experimental characteristic curves indicating applied electric power with optical density with the numbers of sub-lines as parameters, and a heat generating method therefor.
Figure 16:
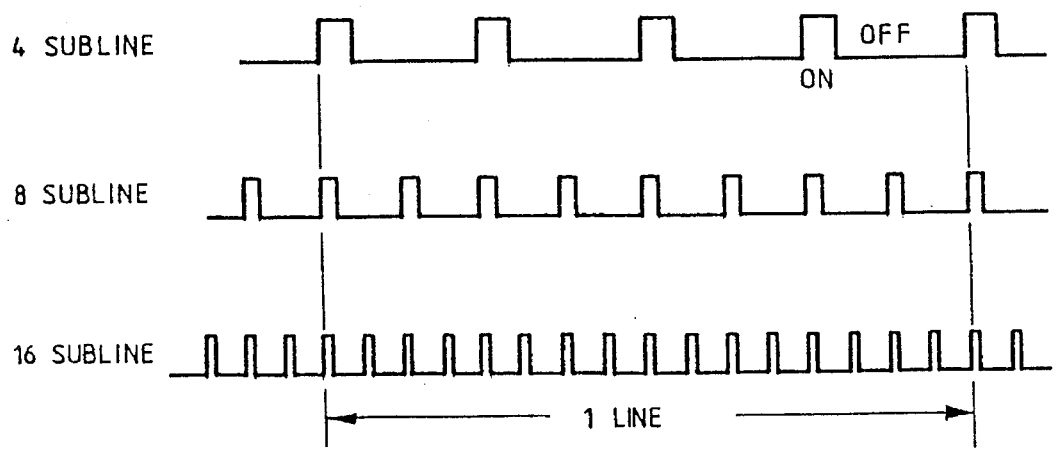

The part (a) of FIG. 16 is an experimental characteristic diagram showing applied electric power with optical density (O.D. value) in the case where the number of sub-lines (U) is changed. In the characteristic diagram, the coloring ink material employed is a sublimated dye, and the number of sub-lines (U) is changed to 4, 8 and 16 according to a fundamental operating equation $S \times U = 256$ (constant). In this case, the generation of heat is as shown in the part (b) of FIG. 16. As is apparent from FIG. 16, the maximum optical intensity can be made high by increasing the number of sub-lines (U). This is due to the fact that the surface of an image receiving layer of polyester or the like coated on an image receiving sheet is not damaged.

On the other hand, when the applied electric power is held constant, the optical density can be increased by decreasing the number of sub-lines (U). That is, it is necessary to provide a function of selecting the number of sub-lines according to a given object. this function can be obtained by adding a selective frequency divider to the clock generator 4 and by adding means for holding the values which are set in the data distributor 3 by using the DATA applied to the terminal 1a. This function makes it possible to select a recording time. That is, in the sub-part (2) of the part (b) of FIG. 16, as for each line, design should be so made as to select a desired one of the numbers of sub-lines (U) 8, 7,6 and 5. This may be equally applied to the case of (c).

As is apparent from the above description, by adding means for varying S and U in the fundamental operation equation, the signal processing device may be provided with "density", "necessary electric power" and "printing time" as parameters.

When the number of sub-lines (U) is four (4) or more, the white stripe which otherwise may be formed by the block division drive can be eliminated, and therefore it is unnecessary to use the correction process which is required in the conventional signal processing device. This has been described in the specification of the aforementioned Japanese Patent Application No. 254203/1986 entitled "Thermal Head Driving Device" in detail.

(Function 2. Variation of the record size)

The thermal head shown in FIG. 3 can print with a cord size of 100 mm (H)×75 mm (V) (hereinafter referred to as "an A6 size", when applicable) substantially. However, depending on the purpose of use, a record size four times as large as the A6 size (hereinafter referred to as "an A4 size", when applicable) is required. A method of providing the A4 size will be described.

The part (a) of FIG. 17 shows the terminal arrangement of a thermal head for the A4 size, and the part (b) of FIG. 17 outlines the generation of heat for a sub-line. As shown in the part (a) of FIG. 17, the data HEAD-DATA consists of twenty (2) data HD1 though HD20, and 1280 heat generating resistors are provided. In each phase, 256 heat generating resistors for four (4) blocks are driven simultaneously. Phases with T=5 form one sub-line.

Figure 18:
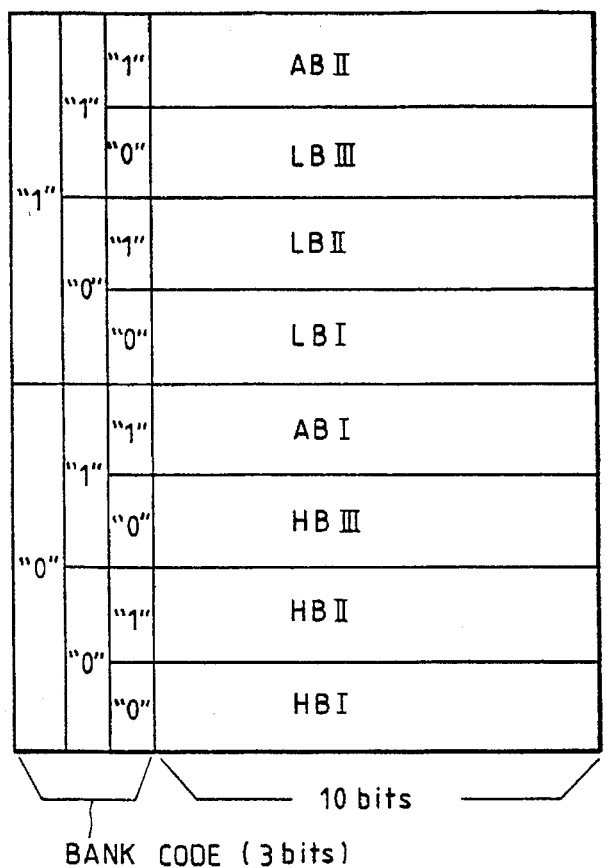
FIG. 18 is an explanatory diagram showing the map of the SRAM in an A4 size printing operation.
Figure 27:
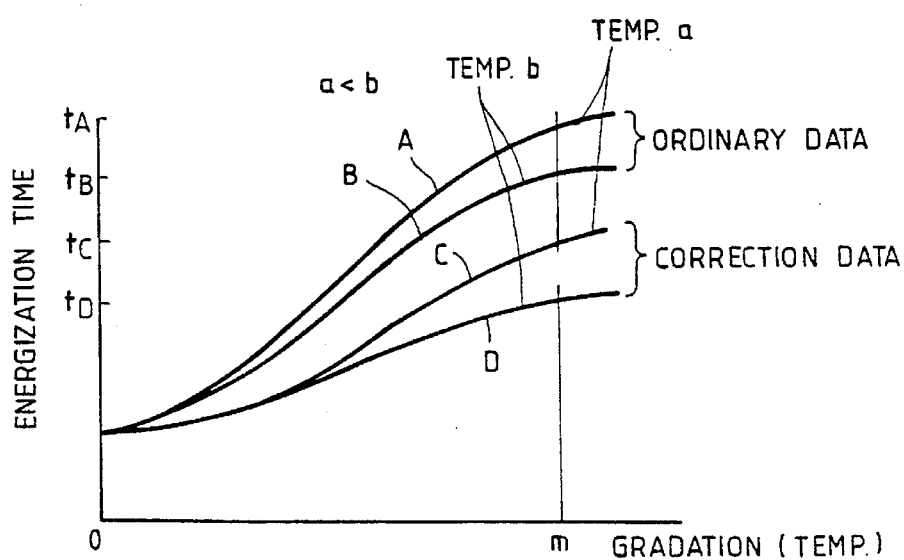
FIG. 27 is a graphical representation indicating gradation (density) with head electrical energization time and head temperatures as parameters.

A method of increasing 640 picture element data per line into 1280 one will be described. In the first one of the methods, merely each picture element is recorded with two resistors with its value held. In the second method, an interpolating picture element is formed by two-dimensional picture element operation, and the original picture element and the interpolating picture element are alternately recorded. The first method is suitable for recording graphic images, and the second method is suitable for recording pictorial images. First, the second method will be described. FIG. 17 shows the bank arrangement of the SRAM in the memory 8 which is used for arithmetic operation. As shown in FIG. 18, a head buffer III (hereinafter referred to merely as "an HB III", when applicable) and aperture buffers I and II (hereinafter referred to merely as "an AB I, and an AB II", respectively, when applicable), each being a 1K byte line buffer, are newly added.

Figure 19:
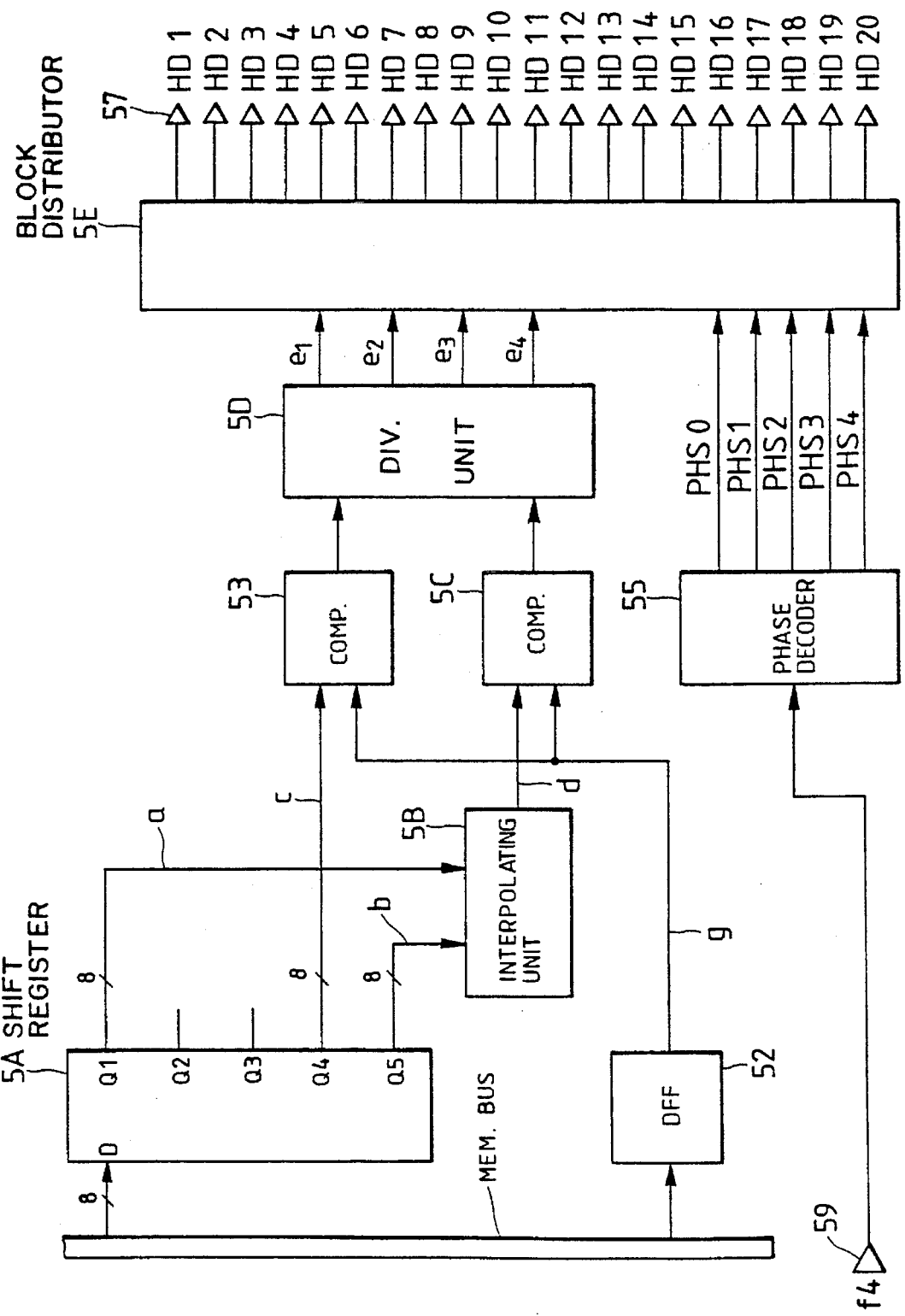
FIG. 19 is a block diagram showing one example of a circuit in which an interpolating unit is added to a head driver.

FIG. 19 shows one example of the circuit which is obtained by adding an interpolating function to the head driver 10 shown in FIG. 11. In FIG. 19, reference character 5A designates a shift register; 5B, an interpolating unit comprising an average value operating unit; 5C and 5D, a comparator and a dividing unit, respectively, which are newly added, and 5E, a block distributor for selectively providing the head data for four of the twenty (20) output signals HD1 through HD20. The other arrangement is the same as that in FIG. 11.

The circuit of FIG. 19 operates as follows:

With four addresses X, X+32, X+64 and X+96 as start addresses, the density data thereof are read, as A, B, C and D groups, out of the head buffers in the SRAM, and multiplexed and applied to the memory bus BUS. The value X changes to 0, 128, 256, 384 and 512 successively at intervals of the phases. The multiplexed density data are applied to the shift register 5A, where they are successively shifted. The flow of the density data is as shown in FIG. 20, in which reference characters $A_{01}$, $B_{01}$, $C_{01}$, $D_{01}$ and so forth represent the results of operation of $A_{01}=(A_0+A_1)/2$ and so forth, qualitatively being the average value of two adjacent picture elements.

Figures 20A, 20B, 20C, 20D, 20E:
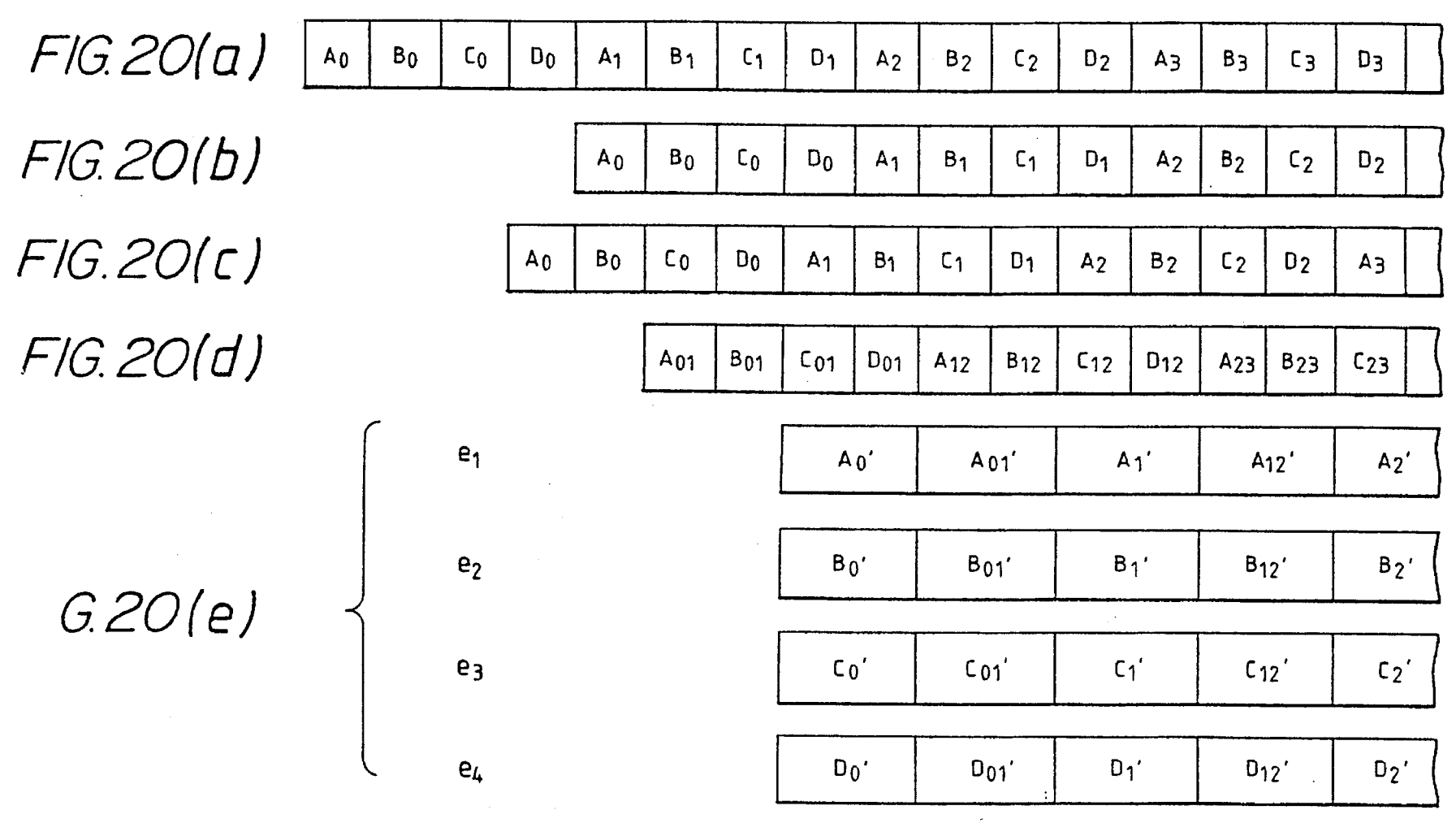

The density data trains indicated in the parts (c) and (d) of FIG. 20, being timed as shown, are applied to the comparators 53 and 5C, where they are compared, in a digital mode, with the gradation data g stored in the DFF 52, to form heat generation on/off signals which are applied to the dividing unit 5D. The dividing unit 5D forms heat generation on/off signals corresponding to four blocks $e_1$ through $e_4$ shown in the part (e) of FIG. 20. These signals thus formed are applied to the block distributor 5E, so that they are provided at the output terminals corresponding to the phases. Thus, the increasing of the number of picture elements by interpolating operation; that is, the enlarging of the image in the direction of the line can be achieved.

Now, the interpolation between lines will be described.

In the A6 size mode, after the aperture correction operation, the density data are stored in the predetermined head buffer; whereas in the A4 size mode, they are temporarily stored in the aperture buffers AB I and AB II alternately at line intervals. It is assumed that the density data are being written in the aperture buffer AB II, and the density data have been stored in the aperture buffer AB I. In this case, after the aperture correction, the operation data are written at a predetermined address in the aperture buffer AB II, and at the same address at one of the three head buffers. The density data at the same address in the aperture buffer AB I is read, and the average value is operated by the arithmetic unit 9, and the result of operation is written in another of the three head buffers. The remaining head buffer has been used for the printing and recording operation of the preceding line. As is apparent from the above description, the interpolation between lines is achieved by additionally providing the buffers in the SRAM of the memory 8, by operating the average value with the arithmetic unit 9, and by forming the sequential control signal with the address generator 6 and the clock generator 4. Thus, the number of lines is doubled.

The interpolation within a line and the interpolation between lines are carried out separately as described above. Therefore, the high speed operation can be carried out with a small quantity of hardware, as a result of which both the manufacturing cost of the signal processing device and the printing and recording time can be reduced as much.

The interpolation within a line, and the interpolation between lines are carried out during the intervals T1 and T2 (FIG. 6), respectively. And, the concerned arithmetic functional equations are described in the specification of JPA No. Sho-62-167183 (Kokai publication No. Hei 1-10782) filed by the present applicant.

In the case of graphic images, in order to obtain a sharp printing and recording result, it is desirable to employ the first method (in which each picture element is merely multiplied by a factor of four). In this case, the interpolating unit 5B of FIG. 19 is not used, and means for selectively providing the signal c as the signal d is provided, and means for causing the arithmetic unit 9 to omit the average value operation is provided.

In this case, the clock generator 4 in the A4 size mode operates to output the signals ($\overline{REQ}$ and $\overline{REQ\text{-}CLK}$) requesting for the transfer of RGB image data once per two lines printing and recording operation. For other circuits, suitable circuits should be added.

Thus, the function of selecting the A6 size or the A4 size, and the selective enlarging function based on the interpolation in the A4 size mode and the method of utilizing the preceding value of a picture element can be realized according to the invention.

(Function 3. Variation of the recording width)

Figure 22:
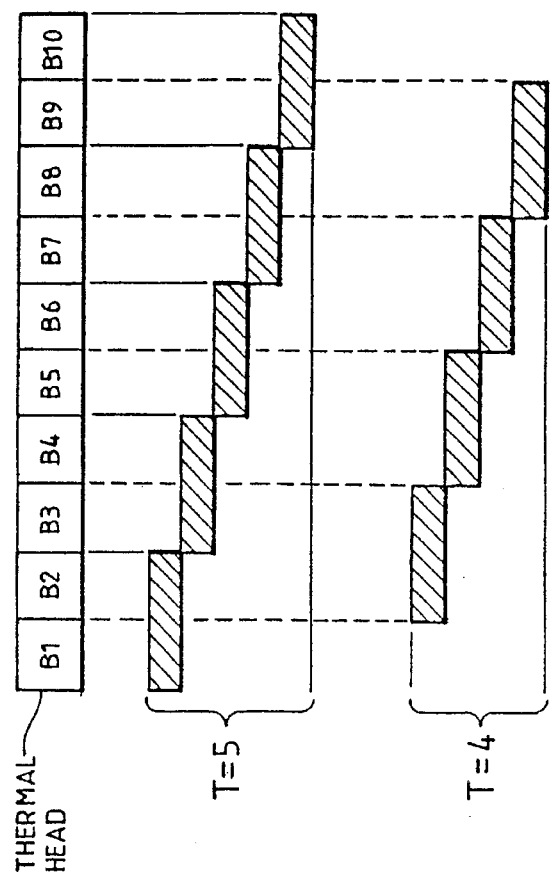
FIG. 22 is an explanatory diagram showing one example of a head drive method in a small width printing operation.
Figure 21A:
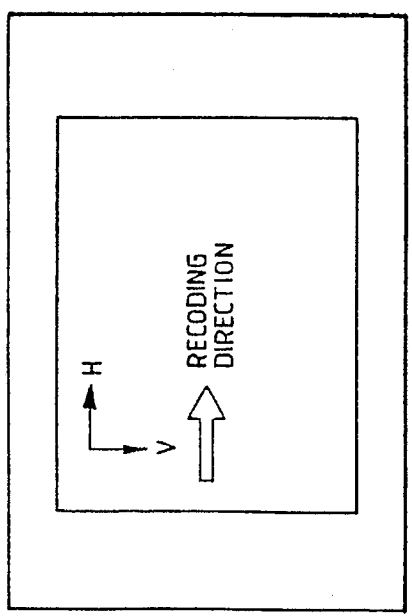
FIG. 21 is an explanatory diagram showing examples of records.
Figure 21B:
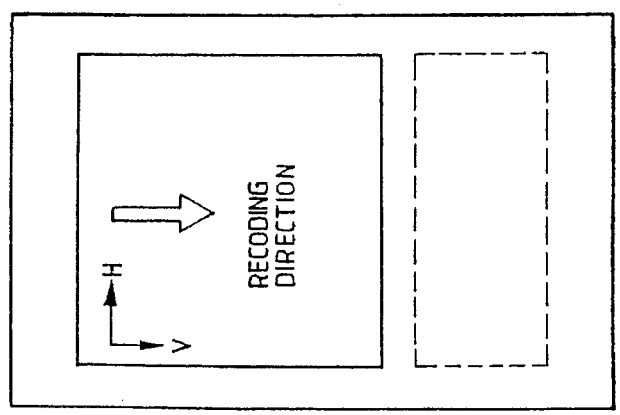
Figure 24:
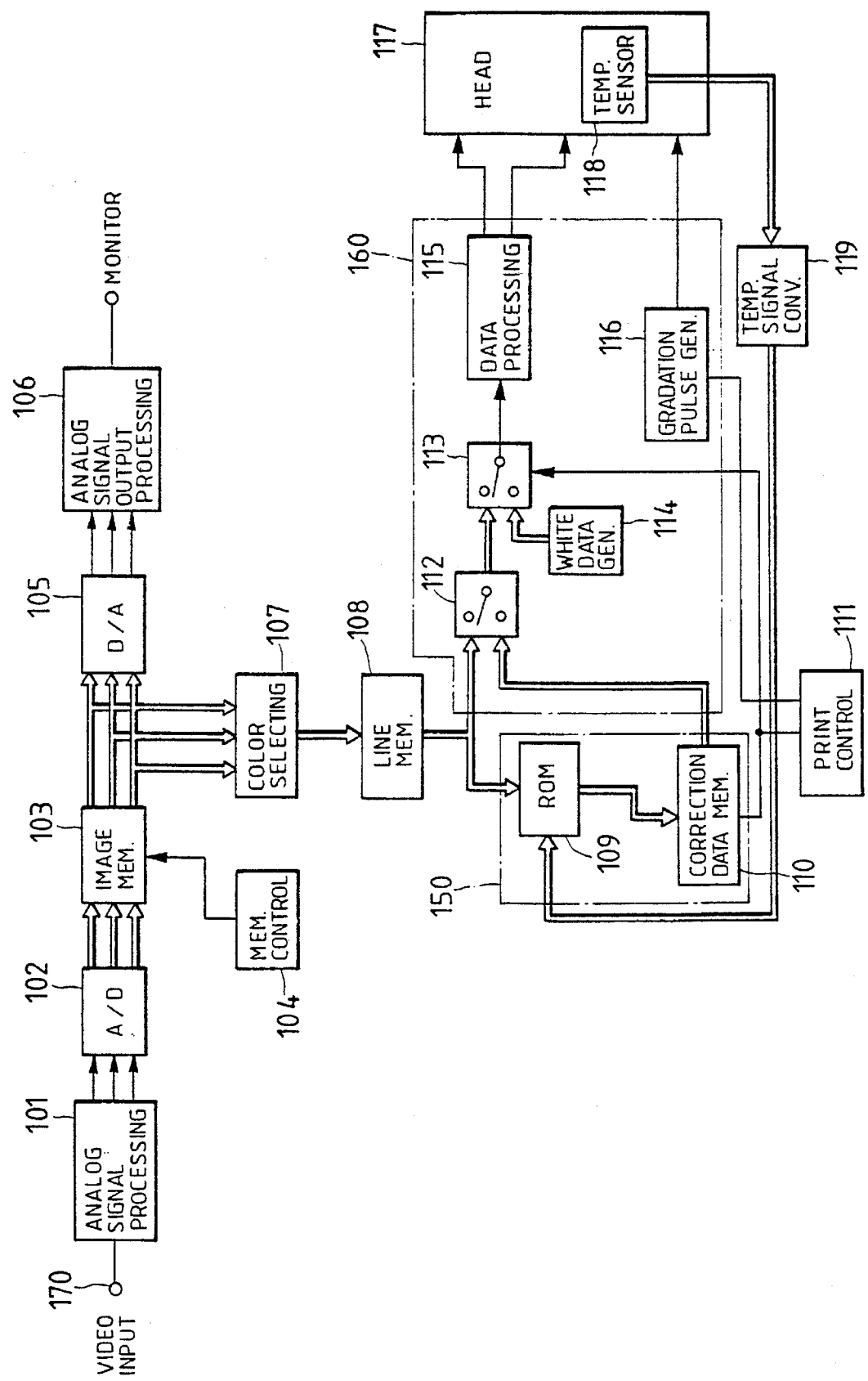
FIG. 24 is a block diagram showing a conventional signal processing circuit for a printer.
Figures 25, 26A, 26B, 26C, 26D:
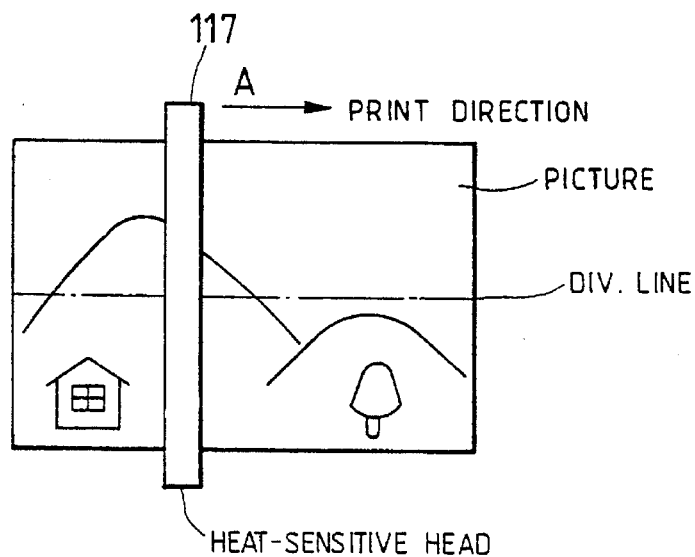
FIG. 25 is an explanatory diagram showing one example of an image recorded with the conventional signal processing circuit, and a white stripe appearing between blocks.
Figure 28:
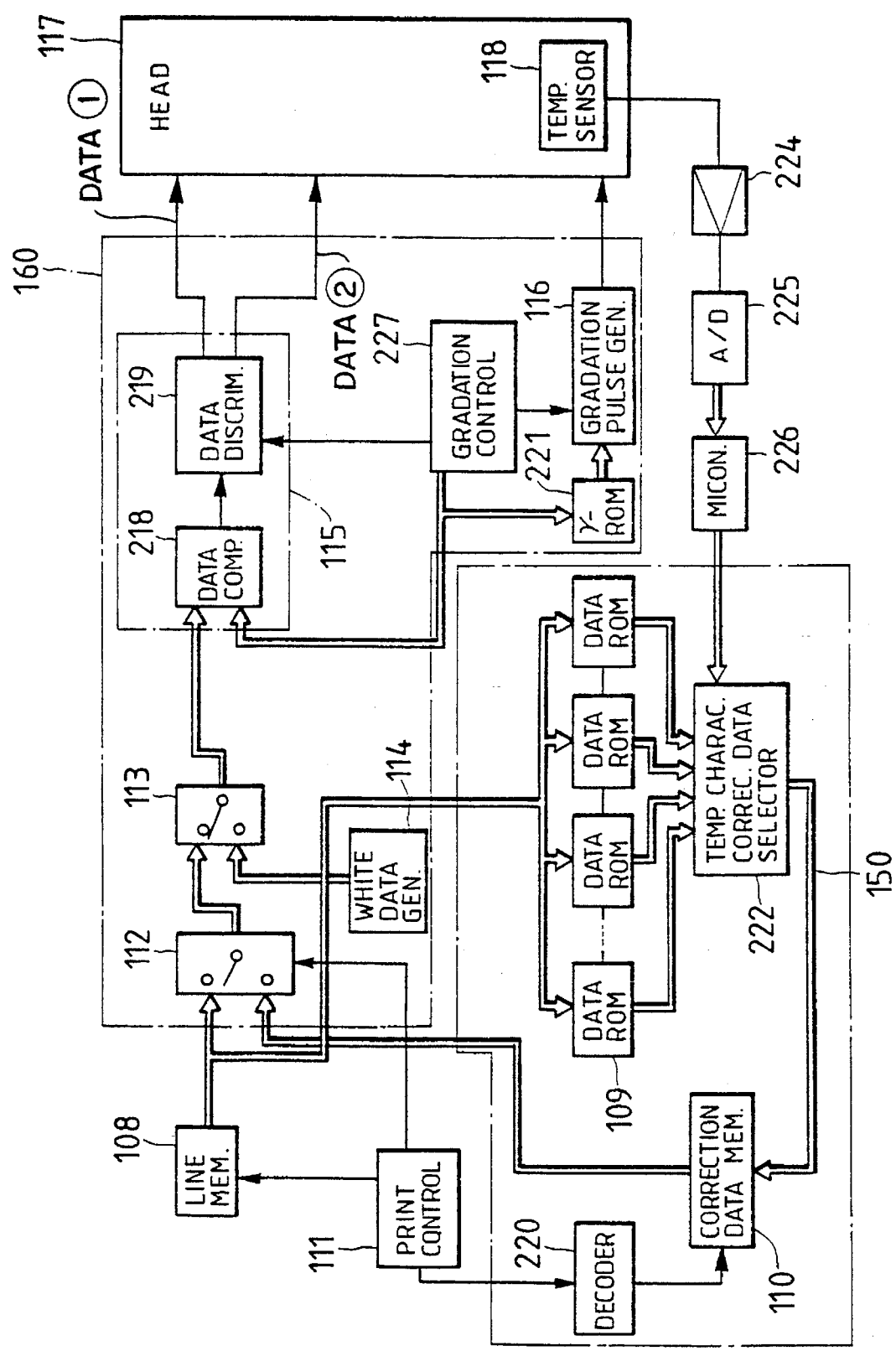
FIG. 28 is a block diagram showing examples of joint processing means and halftone controlling means.

In the A6 size mode, the recording size is fundamentally 100 mm (H)×75 mm (V), and the image receiving sheet's size can be optionally determined, for instance, 120 mm (H)×95 mm (V). However, in the case of a post card, its size is determined as 150 mm×100 mm, and therefore a full printing and recording operation with lines in the 100 mm widthwise direction cannot be performed. Therefore, it is necessary to provide a function of using 512 of the 640 heat generating resistors per line for a printing and recording operation. FIG. 21 shows two records. More specifically, the part (a) of FIG. 21 shows one example of the record formed according to the conventional method, and the part (B) of FIG. 21 shows one example of the record which is formed with seventy-four picture element removed from each of the two end portions of a line. In this case, the following difficulties are involved: That is, the number of phases is T=4, and therefore the heat radiating time is shorter than in the case of T=5, as a result of which the color balance is deteriorated as much. At worst, the surface of the polyester layer formed on the image receiving sheet is toughened, as a result of which the resultant print is low in quality. Accordingly, it is necessary to provide correcting means which can obtain constant density values independently of the number of phases. In addition, it is necessary to take counter-measures against the fact that, in the simultaneous drive, the block division is changed separately according to T=4 and T=5 as shown in FIG. 22. The former requirement can be met by the provision of means for finely adjusting the pulse width of the STB signal of the data HEAD-CONT. That is, in order to change the pulse width, with the aid of the DATA at the input terminal 1a, the pulse width set value is applied to the data distributor 3, and connected through the signal line a2 to the STB signal generator in the clock generator 4. And in this case, a process of decreasing the "on" interval with T=4 and increasing it with T=5 should be carried out. On the other hand, the latter requirement can be satisfied by adding a selector circuit and a gate circuit to the block distributor 56 in FIG. 11. Selection of T=4 or T=5 can be readily achieved by externally applying an identifying signal to the T frequency distributor 44 in FIG. 4. In addition, the signal $\overline{REQ\text{-}CLK}$ should be provided for 512 addresses. The other circuits should be so designed as to be able to perform section as required.

Thus, the printing and recording width and the printing and recording direction can be selected as desired.

(Function 4. Method of switching a color mode and a monochromatic mode over to each other)

A color image is recorded by using Y, M and C inks in the stated order, whereas a monochromatic image is recorded by using only black ink. Therefore, in the latter case, the recording time is one-third (⅓) of that in the former case; that is, monochromatic image can be recorded at higher speed. Therefore, it is necessary to switch a color image recording mode and a monochromatic image recording mode over to each other. For this purpose, it is necessary to provide means for allowing monochromatic image data to bypass the picture element resolver to reach the MPX circuit 7 and the memory bus BUS. In this case, it is necessary to change the gradation table. This can be achieved by adding ROMs as shown in FIG. 2 or by employing a suitable data utilizing method. Addition of this function is advantageous in that the color and monochromatic printing and recording operations with sublimated dye, and the operation of printing and recording image on heat-sensitive sheets can be performed with one and the same signal processing device. (Function 5. Selection of dyes)

In general, the nature of sublimated dye is such that the sublimated dye providing beautiful color is high in optical bleaching speed, whereas the sublimated dye excellent in optical bleaching characteristic cannot provide beautiful color in printing and recording images. In addition to a technique of printing and recording images on image receiving sheets, a technique of printing and recording images on OHP films is important in practical use. In the latter technique, dyes exclusive for the OHP film are used for the purpose of providing high density values. At any rate, it is desirable that the signal processing device can process a plurality of dyes. Therefore, a plurality of color conversion tables are provided for the ROM in memory 8, so that the dyes can be externally selected.

FIG. 23 is a block diagram outlining the arrangement of a video printer which is formed by providing the circuit of the invention in the form of an LSI. In FIG. 23, reference numeral 300 designates an LSI formed by integrating the circuit according to the invention; and 400 designates a data multiplexing unit.

As was described above, the signal processing device according to the invention has not only the functions originally required therefor but also the operation mode selecting means for selecting the recording conditions. Therefore, the signal processing device is free from the difficulty that white stripes are formed by the block division drive of the thermal head. In addition, the device can carry out the aperture correction corresponding to the lack of high frequency components which may be caused by the sampling of video signals, and the color conversion with high precision, and can select the recording conditions.

While the invention has been described with reference to the use of the sublimated dye, it should be noted that the invention is applicable to the case where the printing and recording operation is carried out by using coloring agents such as pigments.

In addition it should be noted that, while the color conversion has been described, the invention is not limited thereto or thereby. That is, a bit plane resolving method disclosed, for instance, by JPA-No. Sho-62- 268905 (Kokai publication No. Hei-1-109967) filed by the present applicant may be employed, and the combination of the embodiment and the bit plane resolving method disclosed, for instance, by JPA No. Sho-62-267163 (Kokai publication No. Hei-1-108868) filed by the present applicant may be employed. In this case, only the hardware arrangement and the conversion algorithm of the picture element resolver 5 are changed, and the ROM is necessary although its capacity can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description;

The present invention will become more fully understood from the detailed description given hereinbelow and the accompanying drawings which are given by way of illustration only, and thus, are not limitative of the present invention and wherein:

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

In addition, the signal processing device may be so designed that the printing direction, one of the printing conditions, can be changed.

In the above-described embodiment, 640 heat generating resistors are employed per line; however, the invention is not limited thereto or thereby. That is, the technical concept of the invention may be applied to the case where, for instance, 768 or 1024 heat generating resistors are employed per line.

Furthermore, the number of quantize bits and the number of density gradations are not limited only to those described above.

Effects of the Invention

As was described above, the signal processing device according to the invention is so designed that a line is printed with a plurality of sub-lines overlapped, the aperture correction and the color conversion are carried out, and the predetermined recording conditions are suitably selected. Therefore, with the signal processing device of the invention, images can be recorded with high density and with high picture quality, and various printing modes such as a color printing mode, a monochromatic printing mode, an A6 size printing mode, and A4 size printing mode can be employed.

What is claimed is:

1. A method of printing a two-dimensional multi-gradation image from a received video signal, comprising:

a) receiving R, G, and B image data;

b) processing said R, G, and B image data to form color conversion data representative of ink density information;

c) performing aperture correction on said color conversion data to produce aperture corrected head driving data, said aperture correction enhancing high frequency components of said color conversion data; and d) printing the two-dimensional multi-gradation image from said aperture corrected head driving data.

2. A signal processing device for a video printer for printing a two-dimensional multi-gradation image comprising:

means for receiving R, G, and B image data;

color conversion data forming means for processing said R, G, and B image data received from said means for receiving and forming color conversion data therefrom representative of ink density information;

aperture correction means, responsive to said color conversion data forming means, for performing an aperture correction operation on said color conversion data to produce aperture corrected head driving data, said aperture correction operation enhancing high frequency components of said color conversion data; and head driving means for printing the two-dimensional multi-gradation image in response to receipt of said aperture corrected head driving data.

3. A method of printing a two-dimensional multi-gradation image from a received video signal, comprising:

a) receiving R, G, and B image data;

b) processing said R, G, and B image data to form color conversion data representative of ink density information;

c) performing an aperture correction operation on said color conversion data to obtain an aperture correction value for producing head driving data, the aperture correction operation including at least one negative weighting coefficient operation; and d) printing the two-dimensional multi-gradation image from said head driving data.

4. A signal processing device for a video printer for printing a two-dimensional multi-gradation image comprising:

means for receiving R, G, and B image data;

color conversion data forming means for processing said R, G, and B image data received from said means for receiving and forming color conversion data therefrom representative of ink density information;

aperture correction means, responsive to said color conversion data forming means, for performing an aperture correction operation on said color conversion data to obtain an aperture correction value for producing head driving data, the aperture correction operation including at least one negative weighting coefficient operation; and head driving means for printing the two-dimensional multi-gradation image in response to receipt of said head driving data from said aperture correction means.

5. A method of printing a two-dimensional multi-gradation image from a received video signal, comprising:

a) receiving R, G, and B image data;

b) processing said R,G, and B image data to form color conversion data representative of ink density information;

c) performing aperture correction on the color conversion data;

d) interpolating the aperture corrected color conversion data and adding a preselected amount of interpolated image pixels to the aperture corrected color conversion data to increase the number of pixels in said image to thereby enlarge the two-dimensional multi-gradation image by producing head driving data which includes the interpolated image pixels; and e) printing the enlarged two-dimensional multi-gradation image from said head driving data.

6. The method of claim 5, wherein said step d) of interpolating includes, i) interpolating adjacent pixels arranged in the aperture corrected color conversion data in a main scanning line direction to form first additional image pixels, ii) adding a preselected amount of said first additional image pixels to the aperture corrected color conversion data in the main scanning line direction, iii) interpolating adjacent pixels arranged in the aperture corrected color conversion data in a sub-scanning line direction to form second additional image pixels, and iv) adding a preselected amount of said second additional image pixels to the aperture corrected color conversion data in the sub-scanning line direction.

7. The method of printing of claim 6, wherein said sub-scanning line direction is orthogonal to said main scanning line direction.

8. The method of printing of claim 6, wherein said step iii) of interpolating adjacent pixels and said step iv) of adding a preselected amount of said second additional image pixels are preformed subsequent to said steps i) of interpolating adjacent pixels and ii) of adding a preselected amount of said first additional image pixels.

9. The method of printing of claim 5, wherein the two-dimensional multi-gradation image includes a plurality of picture elements, the color conversion data being representative of ink density information of each of said plurality of picture elements, said step c) of performing aperture correction comprising:

i) temporarily storing the ink density information corresponding to four immediately adjacent picture elements of a target picture element;

ii) adding the stored ink density information of said four immediately adjacent picture elements to generate adjacent ink density information;

iii) temporarily storing the ink density information corresponding to said target picture element;

iv) adding the stored ink density information of said target picture element to a predetermined reference value to generate adjusted target ink density information;

v) inverting the adjacent ink density information; and vi) adding the inverted adjacent ink density information and the adjusted target ink density information to generate the aperture corrected color conversion data.

10. The method of printing of claim 5, wherein said step c) of performing aperture correction and said step d) of interpolating the aperture corrected color conversion data are carried out per line of said R, G and B image data.

11. A signal processing device for a video printer for printing a two-dimensional multi-gradation image comprising:

means for receiving R, G, and B image data;

color conversion data forming means for processing said R,G, and B image data received from said means for receiving and forming color conversion data therefrom representative of ink density information;

aperture correction means for performing aperture correction on said color conversion data;

interpolation means, coupled to said aperture correction means, for adding a preselected amount of image pixels to said aperture corrected color conversion data to increase the number of pixels in the image to thereby enlarge the two-dimensional multi-gradation image to be printed, said interpolation means producing head driving data representative of the enlarged two-dimensional multi-gradation image; and head driving means for printing the enlarged two-dimensional multi-gradation image in response to receipt of said head driving data from said interpolation means.

12. The signal processing device of claim 11, wherein said interpolation means includes, main scanning line interpolation means for interpolating adjacent pixels arranged in said color conversion data in a main scanning line direction and for adding a preselected amount of image pixels to said aperture corrected color conversion data in the main scanning line direction, and sub-scanning line interpolation means for interpolating adjacent pixels arranged in said aperture corrected color conversion data in a sub-scanning line direction and for adding a preselected amount of image pixels to said aperture corrected color conversion data in the sub-scanning line direction.

13. The signal processing device of claim 7, wherein the two-dimensional multi-gradation image includes a plurality of picture elements, said color conversion data representative of ink density information of each of said plurality of picture elements, said aperture correction means comprising:

first through fourth flip-flops, coupled to said color conversion data forming means, for respectively temporarily storing the ink density information corresponding to four immediately adjacent picture elements of a target picture element;

first adding means, coupled to said first through fourth flip-flops, for adding the ink density information of said adjacent picture elements to generate adjacent ink density information;

a fifth flip-flop, coupled to said color conversion data forming means, for temporarily storing the ink density information corresponding to said target picture element;

second adding means, coupled to said fifth flip-flop, for adding the ink density information of said target picture element to a predetermined reference value to generate an adjusted target ink density information;

an inverter, coupled to said first adding means, for inverting the adjacent ink density information; and third adding means, coupled to said inverter and said second adding means, for adding the inverted adjacent ink density information and the adjusted target ink density information to generate said aperture corrected color conversion data.

14. The signal processing device of claim 7, wherein said aperture correction means performs aperture correction and said interpolation means interpolates per line of said R, G, and B image data.

15. The signal processing device of claim 12, wherein said sub-scanning line interpolation means interpolates adjacent pixels in the sub-scanning line direction subsequent to the interpolation by said main scanning line interpolation means of adjacent pixels in the main scanning line direction.

16. The signal processing device of claim 8, wherein said sub-scanning line direction is orthogonal to said main scanning line direction.

* * * * *